United States Patent
Law et al.

(10) Patent No.: US 10,567,221 B2
(45) Date of Patent: Feb. 18, 2020

(54) NETWORK SCHEDULING

(71) Applicant: HEWLETT PACKARD ENTERPRISE DEVELOPMENT LP, Houston, TX (US)

(72) Inventors: David Law, Musselburgh (GB); James S. Hiscock, Rockport, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 180 days.

(21) Appl. No.: 15/116,674

(22) PCT Filed: May 15, 2014

(86) PCT No.: PCT/US2014/038204
§ 371 (c)(1),
(2) Date: Aug. 4, 2016

(87) PCT Pub. No.: WO2015/174988
PCT Pub. Date: Nov. 19, 2015

(65) Prior Publication Data
US 2017/0126492 A1  May 4, 2017

(51) Int. Cl.
*G06F 15/177* (2006.01)
*H04L 12/24* (2006.01)
*H04L 12/26* (2006.01)
*H04L 12/911* (2013.01)
*H04L 29/08* (2006.01)

(52) U.S. Cl.
CPC .......... *H04L 41/0806* (2013.01); *H04L 43/08* (2013.01); *H04L 47/70* (2013.01); *H04L 29/08072* (2013.01)

(58) Field of Classification Search
CPC ..... H04L 41/0806; H04L 43/08; H04L 47/70; H04L 29/08981; H04L 29/08072
See application file for complete search history.

(56) References Cited

U.S. PATENT DOCUMENTS 6,381,250 B1 * 4/2002 Jacobson ........... H04B 7/18543
370/254
7,788,386 B2 * 8/2010 Svensson ............ H04L 12/1859
370/230

(Continued)

FOREIGN PATENT DOCUMENTS

WO  WO-2013/104375 A1  7/2013
WO  2013/139298 A1  9/2013

OTHER PUBLICATIONS

Hongqiang Liu, "Traffic Planning Under Network Dynamics," Dec. 2014, pp. 1-167, Dissertation.

(Continued)

*Primary Examiner* — Razu A Miah
(74) *Attorney, Agent, or Firm* — Park, Vaughan, Fleming & Dowler LLP

(57) ABSTRACT

In one implementation, a network scheduling method includes collecting information describing pending traffic for a network and generating a plurality of initial scheduling plans for network resources associated with the pending traffic within the network. The network scheduling method also includes analyzing a plurality of scheduling plans derived from the plurality of initial scheduling plans, and defining a current scheduling plan for the network resources from the plurality of scheduling plans.

13 Claims, 20 Drawing Sheets

(56) References Cited

U.S. PATENT DOCUMENTS

| | | | | |
|---|---|---|---|---|
| 7,962,563 B2* | 6/2011 | Becker-Szendy | G06F 16/10 | 709/212 |
| 8,149,698 B1* | 4/2012 | Chu | H04W 72/1257 | 370/230 |
| 8,266,270 B1* | 9/2012 | Gerlach | H04L 43/10 | 709/224 |
| 8,711,855 B1 | 4/2014 | Murphy et al. | | |
| 9,172,738 B1* | 10/2015 | daCosta | H04L 67/00 | |
| 2002/0191539 A1* | 12/2002 | Rawlins | H04L 12/14 | 370/229 |
| 2002/0194251 A1* | 12/2002 | Richter | G06F 9/5011 | 718/105 |
| 2003/0046396 A1* | 3/2003 | Richter | G06F 9/505 | 709/226 |
| 2003/0135632 A1* | 7/2003 | Vrzic | H04L 47/14 | 709/231 |
| 2003/0191795 A1* | 10/2003 | Bernardin | G06F 9/505 | 718/105 |
| 2004/0029525 A1* | 2/2004 | Vertelney | H04H 20/57 | 455/3.03 |
| 2004/0085909 A1* | 5/2004 | Soliman | H04W 24/02 | 370/252 |
| 2004/0205206 A1* | 10/2004 | Naik | H04L 29/06 | 709/230 |
| 2005/0036466 A1* | 2/2005 | Malik | H04L 47/10 | 370/338 |
| 2006/0287905 A1* | 12/2006 | Stoner | G06Q 10/109 | 705/7.21 |
| 2007/0121636 A1* | 5/2007 | Kim | H04L 65/80 | 370/392 |
| 2007/0192860 A1* | 8/2007 | Hiscock | G06F 21/55 | 726/23 |
| 2008/0101255 A1* | 5/2008 | Charzinski | H04L 41/0681 | 370/252 |
| 2008/0134018 A1* | 6/2008 | Kembel | G06F 3/0484 | 715/234 |
| 2008/0186909 A1 | 8/2008 | Kim et al. | | |
| 2009/0196174 A1* | 8/2009 | Ji | H04L 1/0025 | 370/230.1 |
| 2009/0196245 A1* | 8/2009 | Ji | H04L 1/0025 | 370/329 |
| 2009/0252172 A1* | 10/2009 | Hare | H04L 47/72 | 370/400 |
| 2010/0002586 A1* | 1/2010 | Charzinski | H04L 41/5009 | 370/238 |
| 2010/0085927 A1* | 4/2010 | Torsner | H04L 1/1822 | 370/329 |
| 2011/0182248 A1* | 7/2011 | Fan | H04L 47/14 | 370/329 |
| 2011/0208822 A1* | 8/2011 | Rathod | G06Q 30/02 | 709/206 |
| 2011/0225282 A1* | 9/2011 | Hahm | H04L 12/4641 | 709/223 |
| 2011/0242980 A1 | 10/2011 | Bader | | |
| 2011/0276396 A1* | 11/2011 | Rathod | G06F 17/30867 | 705/14.49 |
| 2012/0008499 A1* | 1/2012 | Stanwood | H04L 47/623 | 370/235 |
| 2012/0140633 A1 | 6/2012 | Stanwood et al. | | |
| 2012/0158395 A1 | 6/2012 | Hughes et al. | | |
| 2012/0250571 A1 | 10/2012 | Andrews et al. | | |
| 2013/0058255 A1 | 3/2013 | Casado et al. | | |
| 2013/0083713 A1* | 4/2013 | Johansson | H04W 52/0225 | 370/311 |
| 2013/0121157 A1 | 5/2013 | Logvinov et al. | | |
| 2013/0148638 A1 | 6/2013 | Xing et al. | | |
| 2013/0201996 A1 | 8/2013 | Masputra et al. | | |
| 2013/0243009 A1 | 9/2013 | Andrews et al. | | |
| 2013/0339075 A1* | 12/2013 | Kisin | G06Q 10/10 | 705/7.13 |
| 2014/0025796 A1* | 1/2014 | Vibhor | H04L 67/1097 | 709/222 |
| 2014/0098669 A1 | 4/2014 | Garg et al. | | |
| 2014/0126410 A1 | 5/2014 | Agarwal et al. | | |
| 2014/0254370 A1 | 9/2014 | Kakadia et al. | | |
| 2015/0032895 A1* | 1/2015 | Xu | H04L 43/08 | 709/226 |
| 2015/0081911 A1* | 3/2015 | Li | G06N 3/126 | 709/226 |
| 2015/0113131 A1* | 4/2015 | Veenstra | H04L 41/0803 | 709/224 |
| 2015/0173103 A1 | 6/2015 | Lunden et al. | | |
| 2016/0210578 A1* | 7/2016 | Raleigh | G06Q 10/06375 | |

OTHER PUBLICATIONS

International Search Report and Written Opinion, International Application No. PCT/US2014/038204, dated Jan. 27, 2015, pp. 1-8.

Peng Qin et al., "Bandwidth-Aware Scheduling with SDN in Hadoop: A New Trend for Big Data," Mar. 12, 2014, pp. 1-8.

Peng Sun et al., "Hone: Joint Host-Network Traffic Management in Software-Defined Network", Oct. 17, 2013, pp. 1-25, Journal of Network and Systems Management.

Steven Gringeri et al., "Extending Software Defined Network Principles to Include Optical Transport," IEEE Communications Magazine, Mar. 2013, pp. 32-40, IEEE.

Omar El Ferkouss et al., "Performance Model for Mapping Processing Tasks to Openflow Switch Resources," IEEE ICC 2012, Jun. 10-15, 2012, pp. 1476-1481, IEEE.

Min Luo, "Intelligent Control and Management for SDN-OpenFlow Networks," HENC 2013, Sep. 10, 2013, pp. 1-30, Huawei.

* cited by examiner

| DECISION ID. | REQS. USED LIST | OPTNS. EXCLD. LIST | CHANGES LIST | TRAFFIC PLAN ENTRY | STATUS |
|---|---|---|---|---|---|
| n | REF. TO REQS. 2021 | NULL | NULL | REF. TO PACKET SECTION 2021 | INIT |

| A | X | B | Y | C | Z | ← 2021 |

| DECISION ID. | REQS. USED LIST | OPTNS. EXCLD. LIST | CHANGES LIST | TRAFFIC PLAN ENTRY | STATUS |
|---|---|---|---|---|---|
| n+1 | REF. TO POWER REQS. 2022 | REF. TO PACKET SECTION 2021 | REFS. TO TIME CHANGES | REF. TO PACKET SECTION 2022 | TUNING |

| A | B | C | X | Y | Z | ← 2022 |

| DECISION ID. | REQS. USED LIST | OPTNS. EXCLD. LIST | CHANGES LIST | TRAFFIC PLAN ENTRY | STATUS |
|---|---|---|---|---|---|
| n+2 | REF. TO QoS REQS. 2023 | REF. TO PACKET SECTION 2022 | REFS. TO PKT. ORDER CHANGES | REF. TO PACKET SECTION 2023 | TUNING |

| C | X | B | Y | A | Z | ← 2023 |

| DECISION ID. | REQS. USED LIST | OPTNS. EXCLD. LIST | CHANGES LIST | TRAFFIC PLAN ENTRY | STATUS |
|---|---|---|---|---|---|
| n+3 | REF. TO POWER AND QoS REQS. 2024 | REF. TO PACKET SECTION 2023 | REFS. TO TIME CHANGES | REF. TO PACKET SECTION 2024 | TUNING |

| Z | X | Y | C | B | A | ← 2024 |

| DECISION ID. | REQS. USED LIST | OPTNS. EXCLD. LIST | CHANGES LIST | TRAFFIC PLAN ENTRY | STATUS |
|---|---|---|---|---|---|
| n+4 | REF. TO POWER AND QoS REQS. 2025 | NULL | NULL | REF. TO PACKET SECTION 2025 | TUNED |

| Z | X | Y | C | B | A | ← 2025 |

NETWORK SCHEDULING

BACKGROUND

Various methodologies can be used to conserve energy in communications networks. For example, Institute of Electrical and Electronics Engineers Ethernet (IEEE) standards define two techniques to save energy on an Ethernet link. One methodology is to place the physical layer of a network resource in a low-power state so that the Ethernet link is not signaling idle at full speed and power.

The other methodology is to provide physical layer signaling to indicate when no further data will be transmitted and provide an indication that after a time delay (e.g., at a wake time) data transmission will restart. Additionally, the transmitter and the receiver of an Ethernet link can negotiate a change of a wake time. This enables the wake time, which can result in network traffic latency, to be traded against increased energy savings because a longer wake time will likely allow devices to go into a lower power mode, thereby increasing energy savings.

In addition to power consumption and latency, network traffic may have a variety of communication needs related to different network parameters. For example, such network parameters can also be related to bandwidth, availability, security, or other characteristics of network communication. Because network resources such as network switches handle traffic with differing communications needs, multiple network parameters can be relevant to configuring network resources to meet communications needs of network traffic.

BRIEF DESCRIPTION OF THE DRAWINGS

FIGS. 20A-20E are an illustration of a network scheduling process, according to an implementation.

DETAILED DESCRIPTION

Figure 1:
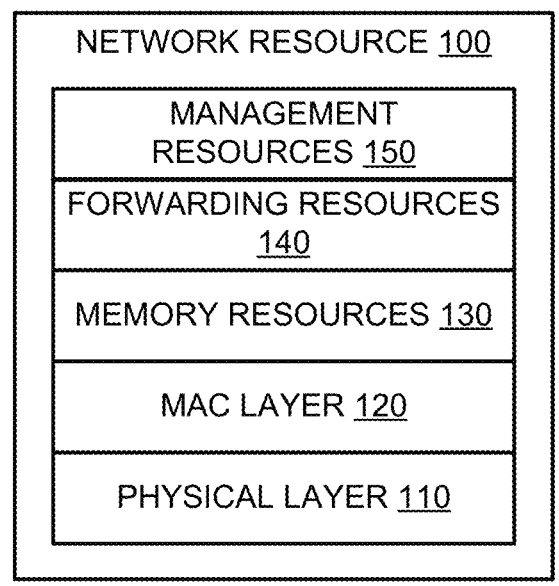
FIG. 1 is a schematic block diagram of a network resource, according to an implementation.

Energy savings can be achieved by profiling network traffic (i.e., data communicated within a communications network). For example, network traffic can be monitored and analyzed to identify properties of that network traffic. As a specific example, profiling network traffic can reveal that current network traffic does not include network traffic that requires low-latency communication. As a result, data packets can be grouped and transmitted in bursts. Such handling can enhance the time network resources remain in a low-power (or energy) state to increase energy savings.

Systems and methods are discussed below that consider various network parameters of network traffic to configure network resources to satisfy communication needs of network traffic (or network applications generating network that traffic). For example, examples of systems and methods discussed below consider information about network parameters related to power consumption, latency, bandwidth, availability, security, and/or other characteristics of network communication and determine how to configure network resources in a time domain to satisfy one or more objectives related to those network parameters. As a specific example in the context of energy savings discussed above, bandwidth and security communication needs in addition to latency can be considered when determining how to configure network resources.

Software-defined networking (SDN) is an approach to communications networks in which network resources (e.g., network switches and routers) communicate with a network controller, which may also be referred to as an SDN controller, to determine which data paths network flows should propagate through a communications network. Communications networks (also referred to as networks) that use SDN techniques are referred to as software-defined networks. SDN technology can provide access to information about multiple factors such as the network hardware configuration, network topology, and information about network requirements and/or expected network traffic from network applications (i.e., applications or services that communicate via networks).

Some network applications communicate with SDN applications that interact with an SDN controller to, for example, collect and provide information about pending traffic for a network. Pending traffic for a network is network traffic that a network application or network applications will transmit via the network. Such information can include network requirements of network applications, network requirements of expected network traffic from network applications, and/or information about network traffic for such network applications. An SDN application can provide such information in real time (i.e., as such information becomes available) and/or a priori via a control plane of a network. Additionally, some SDN applications interact with the SDN controller to request modifications to a software-defined network to improve functionality, properties, or behaviors of network applications. Implementations discussed herein can use information about network traffic—such as information available from SDN applications—to configure network resources to meet objectives such as enhancing energy efficiency of networks.

The information about pending traffic for (i.e., to be transmitted via) a network can be provided to a traffic scheduling system to describe network communication needs such as timing requirements (i.e., requirements or preferences) for the network communications of network applications (e.g., sources and/or destinations, latency, jitter, bandwidth, throughput, quality of service (QoS), and/or other properties of network communications). For example a list of network communications needs such as, for example, timing requirements such as "no earlier than" timing or "no later than" timing, or a set of interrelated network communications with triggers and interdependencies, to describe scheduling flexibility and constraints for the network communications.

A traffic scheduling system hosted at or in communication with an SDN controller can use such information about the pending traffic (e.g. pending flows) for a network to generate descriptions of the network traffic in that network. These descriptions can be combined with a representation (or description of overlay) of the network to describe how the workload for supporting the network traffic at network resources of the network is distributed to each network resource. Thus, the traffic scheduling system can determine how the components such as hardware resources of each network resource will be (or are) utilized.

The traffic scheduling system can analyze this information to define scheduling plans for the network to arrange when and/or via which network resources network communications occur. A scheduling plan represents network traffic and network resources to handle that network traffic in a time domain. For example, a scheduling plan can include information about data that will be transmitted via a network at which times and network resources that will handle (i.e., receive and transmit network traffic along a path to a destination) that network traffic.

The traffic scheduling system uses information provided by, for example, SDN applications, from network applications, and/or from profiling network traffic to determine how network resources should be configured to meet the timing requirements and/or preferences of the network traffic and other objectives such as energy conservation. In some implementations, a traffic scheduling system tunes scheduling plans to meet timing requirements (i.e., required or preferred temporal properties) of the network traffic and other objectives according to priorities. As specific example, the tuning of the scheduling plans can be configured to tune for meeting timing requirements of the network traffic and one or more preferences such as lowest possible power consumption, lowest traffic latency, high bandwidth, high availability, a preferred or desired level of security, or some other network traffic property or properties.

Moreover, the traffic scheduling system may group traffic by specific needs, such as low latency, high availability, or lower power, to create separate scheduling plans for each group, and then combine the scheduling plans for the groups. This combined scheduling plan can be used to configure the network resources of a network to realize (or implement) the combined scheduling plan in the network. Moreover, in some implementations, the traffic scheduling system can tune the groups separately or combined and some groups may take priority over other groups when combining and/or tuning the scheduling plans. In other words, some network traffic parameters can be prioritized over other network traffic parameters.

As one example of a network traffic parameter, managing network traffic to allow network resources (e.g., network interface cards, physical layer devices such as PHYs, network switches, and network routers) to remain in low-energy states can improve energy efficiency of networks. For some network resources, the longer these network resources can remain idle (i.e., the longer the inactive periods of these network resources), the more sub-systems or components can be configured to low-energy states, resulting in increased energy conservation and efficiency. Some systems, methods, and apparatus discussed herein provide for management of networks to conserve energy used by the network resources of those networks. As a specific example, some implementations discussed herein are directed to increasing inactive periods of network resources to increase the number of components of those network resources that can be configured into low-energy states.

FIG. 1 is a schematic block diagram of a network resource, according to an implementation. A network resource is a device or system that facilitates communication within a network. For example, network interface cards, physical layer devices such as PHYs, network switches (also referred to herein as switches), and network routers (also referred to herein as routers) are examples of network resources. Such network resources can include a variety of components or sub-systems that may be configured into low-energy (or low-power) states. Low-energy states are operational states that conserve energy as compared with other states. Network resource 100 includes five components (or sub-systems) that implement various functionalities of a network resource such as a network switch. In other implementations, a network resource can include more or fewer components than illustrated in FIG. 1 with different functionalities or combinations of functionalities of that network resource as compared with network resource 100.

Network resource 100 includes physical layer component 110, MAC (medium access control) layer component 120, memory resources component 130, forwarding resources component 140, and management resources component 150. Physical layer component 110 includes, for example, physical layer hardware resource such as transmitters, receivers, PHYs, or other physical layer resources of network resource 100. MAC layer component 120 includes, for example, link layer hardware resources of network resource 100. Memory resources component 130 includes, for example, hardware memory resources used for packet storage such as DMA (direct memory access) controllers, buffer memory, or other memory resources of network resource 100. Forwarding resources component 140 includes, for example, forwarding hardware resources such as ASICs (application-specific integrated circuits) and other logic circuitry of network resource 100. Management resource component 150 includes resources such as ASICs, processors, or other resources that implement or support management functionalities of network resource 100.

In this example, each of physical layer component 110, MAC layer component 120, memory resources component 130, forwarding resources component 140, and management resources component 150 can be configured or put into a low-energy state with an associated energy conservation measure. The energy conservation measure for the low-energy state of each of physical layer component 110, MAC layer component 120, memory resources component 130, forwarding resources component 140, and management resources component 150 is an estimate, assumed, predicted, calculated, measured, or otherwise determined quantity of energy that can be conserved (e.g., per unit of time) by configuring that component of network resource 100 into that low-energy state. In other words, the energy conservation measure is an amount or quantity of energy savings that is expected when a component of network resource 100 is in a low-energy state.

Typically, configuring components of network resource 100 into and out of low-energy states defines a period of time that limits under which conditions a particular component can be configured into a low-energy state to conserve energy. For example, if a component of network resource 100 will be idle for a period of time exceeding the amount of time required to configure that component into and out of a low-energy state, configuring that component into the low-energy state may conserve energy without disrupting network traffic. However, if that component of network resource 100 will be idle for a period of time equal to or less than the amount of time required to configure that component into and out of a low-energy state, configuring that component into the low-energy state may disrupt network traffic (i.e., that component may not be in an active or functional state when it should be available to communicate data). Some implementations discussed herein are directed to increasing idle or inactive periods for network resources to allow components of those network resources to be configured into low-energy states.

Figure 2:
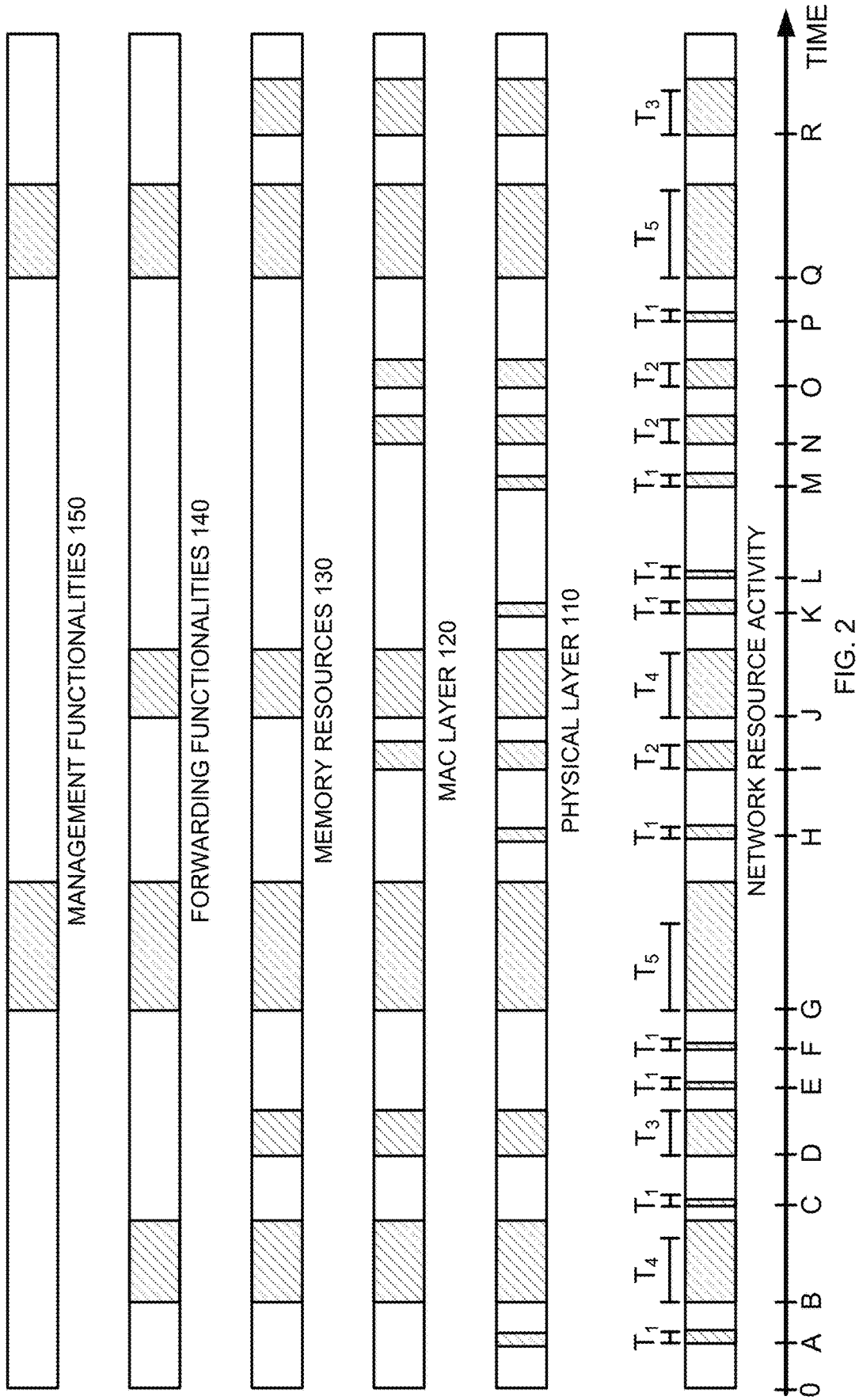
FIG. 2 is an illustration of energy conservation modes of the network resource illustrated in FIG. 1, according to an implementation.

FIG. 2 is an illustration of energy conservation modes of the network resource illustrated in FIG. 1, according to an implementation. As used herein, the term "energy conservation mode" refers to a configuration of one or more components of a network resource in low-energy states. The upper five horizontal bars indicate whether an associated component of network resource 100 is configured in a low-energy state. The bottom horizontal bar indicates when a network resource should be active to handle network traffic. The sections of this bar with hatching indicate when network resource 100 can be inactive (e.g., does not need to handle network traffic). Such information can be determined from scheduling plans discussed herein.

The sections of the bars associated with components of network resource 100 with hatching indicate that that component can be configured into a low-energy state. More specifically, if network resource 100 will be inactive for a period of time at least as long as $T_1$, physical layer component 110 can be configured into a low-energy state, and MAC layer component 120, memory resources component 130, forwarding resources component 140, and management resources component 150 can remain in another state. This configuration of the components of network resource 100 can be referred to as an energy conservation mode of network resource 100. In this energy conservation mode, network resource 100 can be said to conserve an amount of energy substantially equal to the energy conservation measure of physical layer component 110. As illustrated in FIG. 1, network resource 100 can be configured in this energy conservation mode at times A, H, K, and M because network resource 100 can be inactive for time periods at least as long as $T_1$ at these times. Network resource 100 cannot be configured in this energy conservation mode at times C, E, F, L, and P because network resource 100 cannot be inactive for time periods at least as long as $T_1$ at these times.

Similarly, if network resource 100 will be inactive for a period of time a least as long as $T_2$, physical layer component 110 and MAC layer component 120 can be configured into low-energy states, and memory resources component 130, forwarding resources component 140, and management resources component 150 can remain in another state. This configuration of the components of network resource 100 can be referred to as another energy conservation mode of network resource 100. In this energy conservation mode, network resource 100 can be said to conserve an amount of energy substantially equal to the sum of energy conservation measures of physical layer component 110 and MAC layer component 120. As illustrated in FIG. 1, network resource 100 can be configured in this energy conservation mode at times I, N, and O because network resource 100 can be inactive for time periods at least as long as $T_2$ at these times.

Additionally, if network resource 100 will be inactive for a period of time a least as long as $T_3$, physical layer component 110, MAC layer component 120, and memory resources component 130 can be configured into low-energy states, and forwarding resources component 140 and management resources component 150 can remain in another state. This configuration of the components of network resource 100 can be referred to as yet another energy conservation mode of network resource 100. In this energy conservation mode, network resource 100 can be said to conserve an amount of energy substantially equal to the sum of energy conservation measures of physical layer component 110, MAC layer component 120, and memory resources component 130. As illustrated in FIG. 1, network resource 100 can be configured in this energy conservation mode at times D and R because network resource 100 can be inactive for time periods at least as long as $T_3$ at these times.

Moreover, if network resource 100 will be inactive for a period of time a least as long as $T_4$, physical layer component 110, MAC layer component 120, memory resources component 130, and forwarding resources component 140 can be configured into low-energy states, and management resources component 150 can remain in another state; and if network resource 100 will be inactive for a period of time a least as long as $T_5$, physical layer component 110, MAC layer component 120, memory resources component 130, forwarding resources component 140, and management resources component 150. Each of these two configurations of the components of network resource 100 can also be referred to as energy conservation modes of network resource 100. In the former energy conservation mode, network resource 100 can be said to conserve an amount of energy substantially equal to the sum of energy conservation measures of physical layer component 110, MAC layer component 120, memory resources component 130, and forwarding resources component 140. As illustrated in FIG. 1, network resource 100 can be configured in this former energy conservation mode at times B and J because network resource 100 can be inactive for time periods at least as long as $T_4$ at these times. In the latter energy conservation mode, network resource 100 can be said to conserve an amount of energy substantially equal to the sum of energy conservation measures of physical layer component 110, MAC layer component 120, memory resources component 130, forwarding resources component 140, and management resources component 150. As illustrated in FIG. 1, network resource 100 can be configured in this latter energy conservation mode at times G and Q because network resource 100 can be inactive for time periods at least as long as $T_5$ at these times.

Said differently, in this example, network resource 100 has five energy conservation modes, and the energy conservation mode into which network resource 100 can be configured depends on the period during which network resource 100 will be inactive. The longer the inactive period (i.e., the period of time during which network resource 100 will be inactive), the more components of network resource 100 can be configured into low-energy states, resulting in more energy savings (or conservation) both in the aggregate and per unit of time.

As examples, $T_1$ can be on the order of microseconds, $T_2$ can be on the order of milliseconds, $T_3$ can be on the order of tens milliseconds, $T_4$ can be on the order of hundreds of milliseconds, and $T_5$ can be on the order of seconds to minutes. In other implementations, the inactive periods for each energy conservation mode and low-energy state of components of a network resource can be different than these examples. Moreover, in some implementations, an energy conservation mode can include shutting down a network resource. For example, a network resource can be configured into a sleep mode or offline mode as an energy conservation mode. Network scheduling processes and systems discussed herein can define scheduling plans for networks (or network scheduling plans) that increase inactive periods of network resources to reduce energy consumption of a network.

Figure 3:
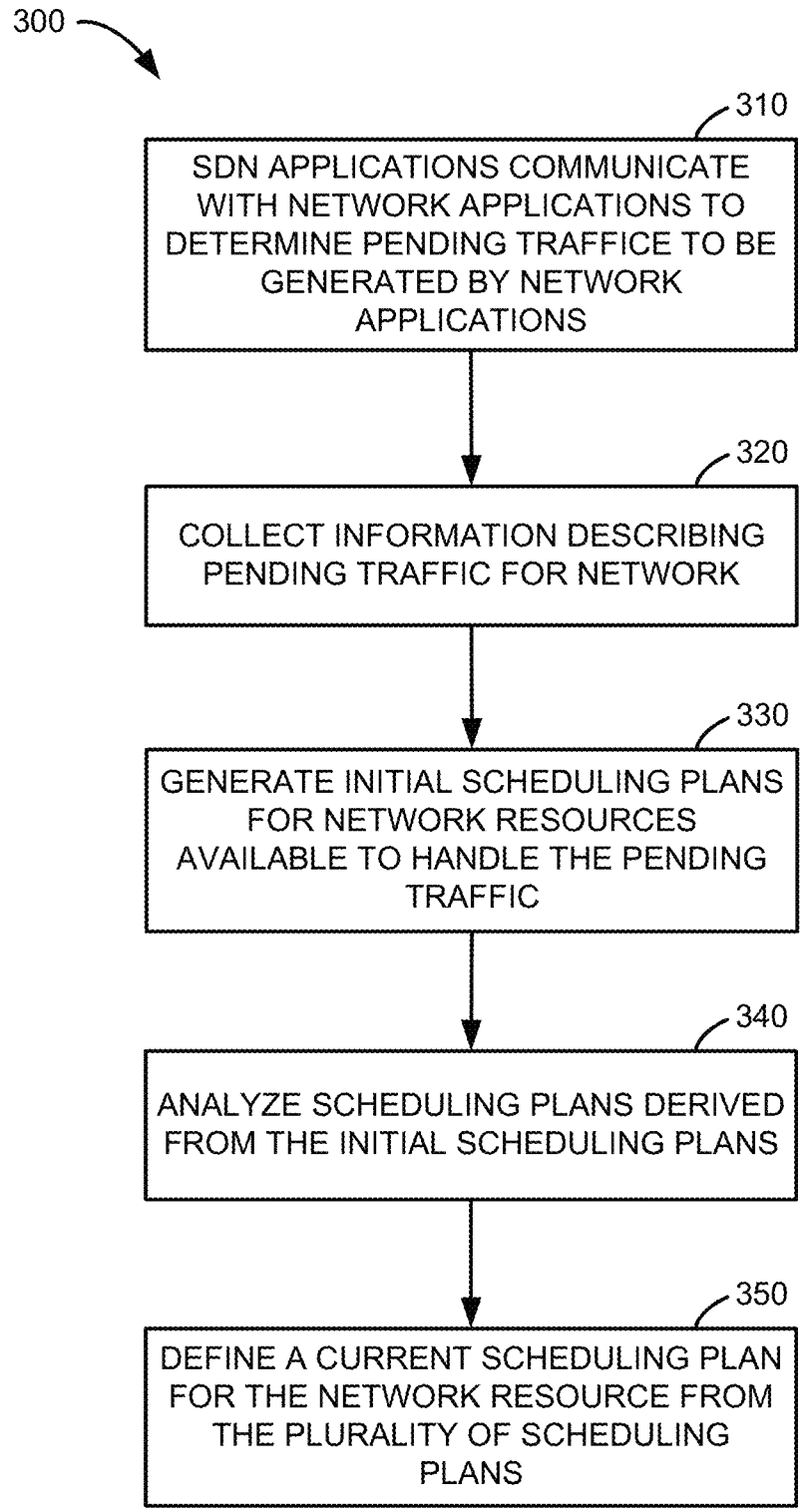
FIG. 3 is a flowchart of a network scheduling process, according to an implementation.

FIG. 3 is a flowchart of a network scheduling process, according to an implementation. Networking scheduling process 300 can be implemented or realized at a variety of hosts. For example, process 300 can be implemented at one or more computing systems implementing a traffic scheduling system. As another example, process 300 can be implemented at logic circuitry such as one or more ASICs implementing a traffic scheduling system. As yet another example, process 300 can be implemented at a combination of one or more computing systems and logic circuitry. Additionally, functionalities or actions described herein as being performed by process 300 should be understood to be performed by a host implementing process 300.

In the example illustrated in FIG. 3, SDN applications communicate with network applications to determine what pending traffic will be generated at or by those network applications at block 310. SDN applications can also communicate with network applications to determine the network communication needs such as timing requirements of the pending traffic that will be generated at or by those network applications. For example, a collaboration network application can provide information to an SDN application about the number of video streams, audio streams, and/or collaboration sessions users of that network application have requested. Additionally, that collaboration network application can indicate to SDN application network communication needs of those video streams, audio streams, and/or collaboration sessions such as bit rates, jitter requirements, QoS requirements, and/or latency requirements, for example. The SDN application can then provide this information to a traffic scheduling system implementing process 300.

As illustrated in FIG. 3, information describing pending traffic for a network is collected at a traffic scheduling system at block 320. For example, information about pending traffic for a network that describes the network communication needs such as timing requirements for the network communications of network applications can be received from SDN applications. In some implementations, this information can be accessed at SDN applications. In other implementations, SDN applications can send this information to a traffic scheduling system implementing process 300.

Initial scheduling plans for network resources available to handle the pending traffic are then generated at block 330. Each initial scheduling plan generated at block 330 identifies a combination of one or more network resources that can handle the pending traffic (i.e., transfer the pending traffic from a source to a destination) and describes timing properties for those network resources and/or data packets of the pending traffic that satisfy the various network communication needs (e.g., timing requirements) of the pending traffic.

For example, process 300 can access descriptions of network resources available in a network to handle the pending traffic (i.e., transfer the pending traffic between two endpoints while satisfying various requirements such as timing requirements of the pending traffic) and the network communication needs of the pending traffic received at block 320. The initial scheduling plans can be generated at block 330 by first identifying groups of one or more network resources of those network resources that can individually or collectively handle the pending traffic. That is, identifying groups of one or more network resources of those network resources that can individually or collectively transmit the pending traffic through the network from a source to a destination. These combinations of network resources represent different paths through that network, with different properties (e.g., latency, security, redundancy, and throughput).

The initial scheduling plans can then be generated from those groups of network resources by varying configurations such as timing configuration of the network resources in these groups of network resources and/or data packets of the pending traffic according to network communication needs (e.g., timing requirements) of the pending traffic. As other example initial scheduling plans can be generated by varying—within the initial scheduling plans—configurations or properties of the network resources in these groups of network resources and/or data packets of the pending traffic related to network traffic parameters such as power consumption, traffic latency, bandwidth, high availability, quality of service (QoS), a preferred or desired level of security, or some other network traffic property or properties The various combinations of network resources and configurations are described in the initial scheduling plans.

In some implementations, preferences are accessed and considered at block 330 to generate initial scheduling plans that satisfy such preferences. For example, such preferences can specify a maximum latency or minimum latency for network traffic. Initial scheduling plans that would violate either preference can be discarded or not generated at block 330.

At block 340, one or more scheduling plans derived from the initial scheduling plans are analyzed to identify a scheduling plan or combination of scheduling plans that most effectively meets one or more objectives. The scheduling plans analyzed at block 340 can be derived from the initial scheduling plans by a tuning system including one or more tuning engines as discussed in more detail below. In other implementations, the scheduling plans derived from the initial scheduling plans are the initial scheduling plans themselves.

In some implementations, preferences or objectives for tuning defined by preferences can be prioritized, and priorities of preferences can be accessed at block 340 to determine which objectives are more important or preferred in comparison with other objectives. Thus, the scheduling plans can be analyzed based on prioritized objectives, and scheduling plans satisfying high priority objectives can be identified over scheduling plans satisfying only lower priority objectives.

The scheduling plan or scheduling plans identified at block 340 are then used to define a current scheduling plan for network resources to handle the pending traffic at block

350. A current scheduling plan is a scheduling plan that a traffic scheduling system or component thereof has output for use by other systems, components, or engines. For example, the scheduling plan or scheduling plans can be combined to define a current scheduling plan that will be used to configure the network resources to handle the pending traffic. In another example, one scheduling plan can be selected from a group of scheduling plans identified at block 340 as the current scheduling plan.

The current scheduling plan defined at block 350 is a scheduling plan that best satisfies or balances objectives of a traffic scheduling system according to some criterion or criteria. For example, the current scheduling plan can be a scheduling plan that provides lowest power consumption, lowest traffic latency, highest bandwidth, highest availability, highest security, or some other preferred network traffic property in comparison with other scheduling plans analyzed at block 340. Alternatively, the current scheduling plan can be a scheduling plan that provides a best balance of network traffic properties in comparison with other scheduling plans analyzed at block 340.

Figure 4:
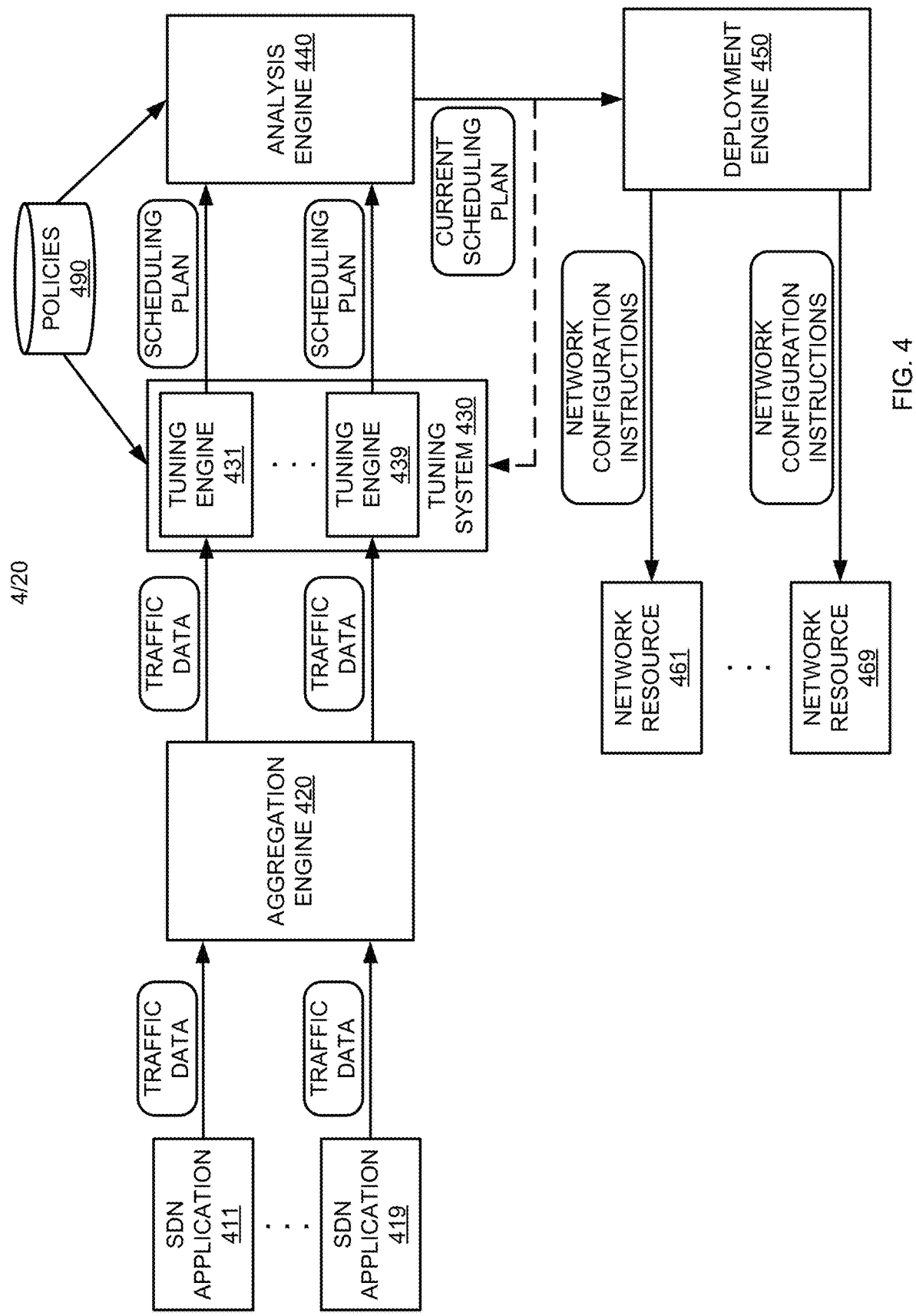
FIG. 4 is an illustration of a network scheduling process using a traffic scheduling system, according to an implementation.

FIG. 4 is an illustration of a network scheduling process using a traffic scheduling system, according to an implementation. More specifically, FIG. 4 illustrates interaction among SDN applications 411-419, aggregation engine 420, tuning system 430, analysis engine 440, deployment engine 450, and network resources 461-469. Tuning system 430, analysis engine 440, and deployment engine 450 can be collectively referred to as a traffic tuning system.

Figure 5:
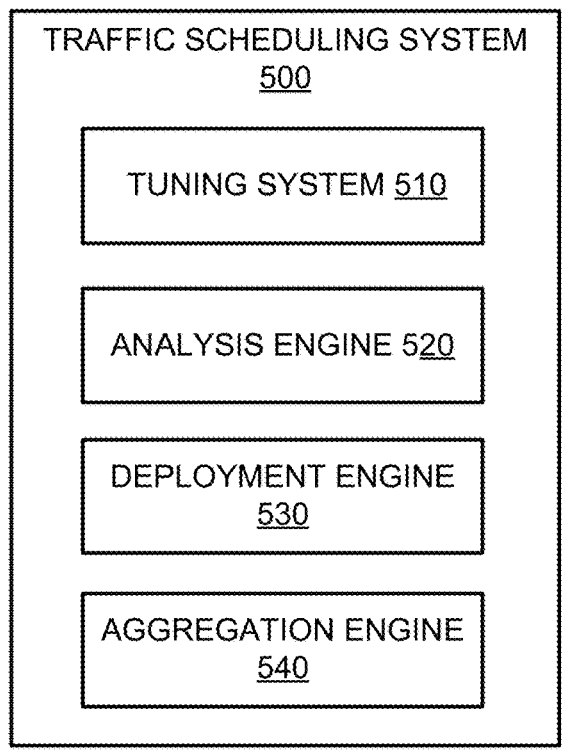
FIG. 5 is a schematic block diagram of a traffic scheduling system, according to an implementation.

As an example of such a traffic tuning system, FIG. 5 is a schematic block diagram of a traffic scheduling system, according to an implementation. Traffic scheduling system 500 includes tuning system 510, analysis engine 520, deployment engine 530, and aggregation engine 540. Various features of a traffic scheduling system are discussed below, for example, in connection with FIG. 4.

Tuning system 510 is a combination of hardware and software that tunes scheduling plans as discussed in more detail below. In other words, tuning system 510 modifies scheduling plans to more preferably or more optimally schedule pending traffic in a network according to one or more traffic tuning parameters. For example, as discussed below, tuning system 510 can include tuning engines to tune scheduling plans for different traffic tuning parameters. As a specific example, tuning system 510 can include one or more tuning engines to, for example, re-order packets for QoS, handle secure traffic differently from unsecured traffic, increase inactive periods of network resources handling network traffic by scheduling pending traffic to increase gaps between data packets or groups of data packets, and/or other variations to meet network requirements of pending traffic.

Analysis engine 520 is a combination of hardware and software that analyzes tuned scheduling plans to define a current scheduling plan for network resources that will handle pending traffic for a network. For example, analysis engine 520 can compare tuned scheduling plans with preferences for traffic tuning parameters based on weights, importance measures, or priorities of each preference to consider various traffic tuning parameters, and define a current scheduling plan that balances or accounts for the traffic tuning parameters according to weights, importance measures, or priorities.

Deployment engine 530 is a combination of hardware and software that generates network configuration instructions to configure network resources to realize or implement a current scheduling plan. Additionally, in some implementations, deployment engine 530 provides network configuration instructions to network resources (e.g., via a control plane of a network).

Aggregation engine 540 is a combination of hardware and software to collect information about pending traffic for a network (e.g., a description of the pending traffic including network requirements such as timing requirements of the pending traffic) and provide information about the pending traffic to a tuning system. In some implementations, an aggregation engine receives or accesses information about pending traffic for a network from network applications via an SDN application (e.g., via a control plane of a network), and provides that information to a tuning system. In other implementations, an aggregation engine receives or accesses information about pending traffic for a network from network applications via an SDN application and generates initial scheduling plans for network resources within the network to handle the pending traffic. The aggregation engine then provides the initial scheduling plans to the tuning system.

In some implementations, traffic scheduling system 500 is implemented at logic circuitry such as an ASIC or group of ASICs. In other words, each of tuning system 510, analysis engine 520, and deployment engine 530 can be implemented as blocks of logic circuitry. In other implementations, traffic scheduling system 500 is implemented at a computing system as illustrated in FIG. 6.

Figure 6:
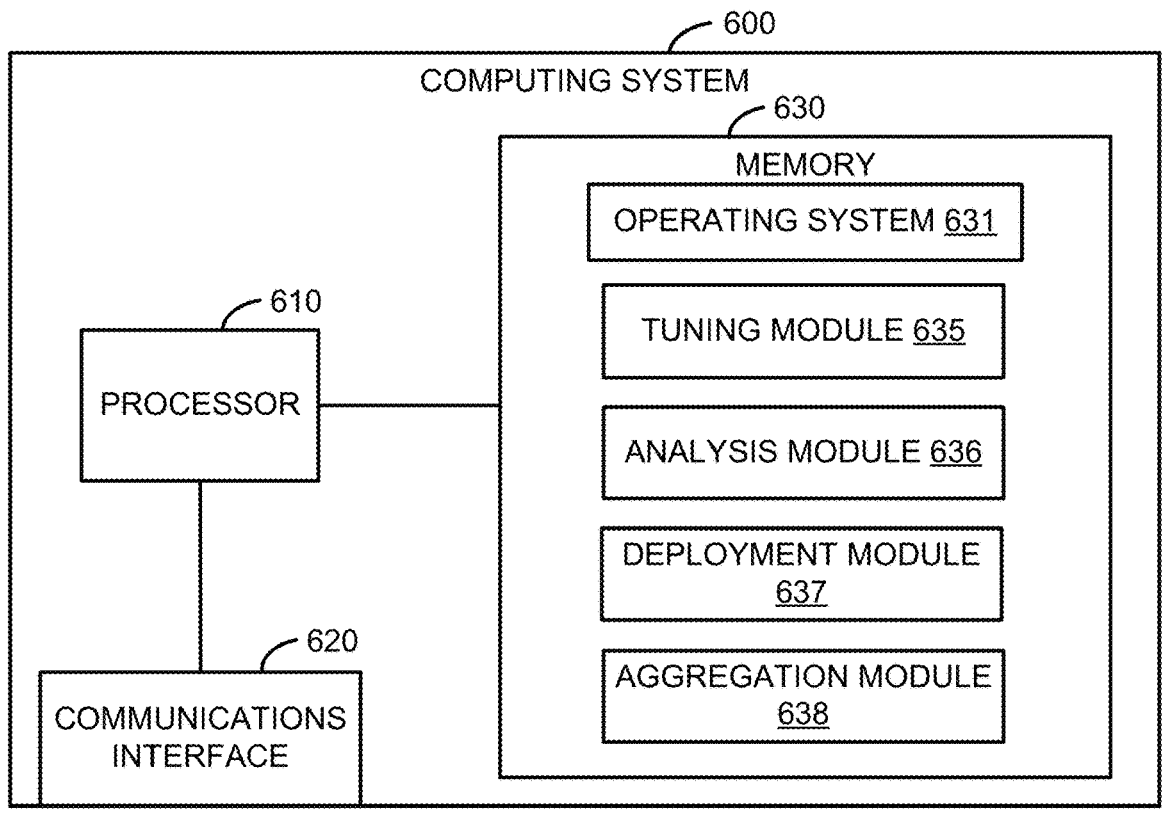
FIG. 6 is a schematic block diagram of computing device implementing a traffic scheduling system, according to an implementation.

FIG. 6 is a schematic block diagram of computing device implementing a traffic scheduling system, according to an implementation. As illustrated in FIG. 6, computing system 600 includes processor 610, communications interface 620, and memory 630. Processor 610 is any combination of hardware and software that executes or interprets instructions, codes, or signals. For example, processor 610 can be a microprocessor, an application-specific integrated circuit (ASIC), a graphics processing unit (GPU) such as a general-purpose GPU (GPGPU), a distributed processor such as a cluster or network of processors or computing systems, a multi-core or multi-processor processor, a virtual or logical processor, or some combination thereof. As a specific example, in some implementations, processor 610 can include multiple processors such as one or more general purpose processors and one or more ASICs.

Communications interface 620 is an interface via which processor 610 can communicate with other processors or computing systems via a communications link. As a specific example, communications interface 620 can include a network interface card and a communications protocol stack hosted at processor 610 (e.g., instructions or code stored at memory 630 and executed or interpreted at processor 610 to implement a network protocol) to receive data from and send data to other computing systems. As specific examples, communications interface 620 can be a wired interface, a wireless interface, an Ethernet interface, a Fibre Channel interface, an IEEE 802.11 interface, or some other communications interface via which processor 610 can exchange signals or symbols representing data to communicate with other processors or computing systems.

Memory 630 is one or more processor-readable media that store instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 630 can be a volatile random access memory (RAM), a persistent data store such as a hard-disk drive or a solid-state drive, a compact disc (CD), a digital versatile disc (DVD), a Secure Digital™ (SD) card, a MultiMediaCard (MMC) card, a CompactFlash™ (CF) card, or a combination thereof or of other memories. In other words, memory 630 can represent multiple processor-readable media. In some implementations, memory 630 (or some portion thereof) can be integrated with processor 610, separate from processor 610, and/or external to computing system 600.

Memory 630 includes instructions or codes that can be executed at processor 610. In this example, memory 630 includes instructions that define operating system 631 when executed at process 610, tuning module 635, analysis module 636, deployment module 637, and aggregation module 638. A module is a collection of instruction that when executed or interpreted at a process cause the processor to implement an engine or system. Thus, tuning module 635, analysis module 636, deployment module 637, and aggregation module 638 implement a tuning system (i.e., one or more tuning engines), an analysis engine, a deployment engine, and an aggregation engine, respectively, when executed at processor 610. Memory 630 is also operable to store additional data structures, codes, or instructions to implement other modules not illustrated in FIG. 6 such as an aggregation module that implements an aggregation engine when hosted at (e.g., executed or interpreted at) processor 610.

In some implementations, tuning module 635, analysis module 636, and deployment module 637 can be implemented within a virtual machine hosted at computing system 600. Moreover, in some implementations, a traffic scheduling system is implemented at logic circuitry and at a computing device. In other words, a traffic scheduling system can be distributed across logic circuitry and one or more computing systems. For example, a traffic scheduling system can include a tuning system and an analysis engine implemented at an ASIC and a deployment engine implemented at a virtual machine.

Referring again to FIG. 4, the flow of information among the entities of FIG. 4 is logical. In other words, entities represented in FIG. 4 may be in communication one with another via systems and/or resources not illustrated in FIG. 4. SDN applications 411-419 provide traffic data to aggregation engine 420. That is, SDN applications 411-419 provide information about pending traffic for a network directly or indirectly (e.g., via one or more SDN applications) to aggregation engine 420. Aggregation engine 420 receives the traffic data from SDN applications 411-419 and provides pending traffic data to tuning system 430. In other implementations, aggregation engine 420 generates initial scheduling plans from the pending traffic data received from SDN applications 411-419, and provides the initial scheduling plans to tuning system 430.

In some implementations, aggregation engine 420 groups the traffic data (e.g., information or initial scheduling plans) according to network requirements of the pending traffic described by the traffic data. For example, traffic data associated with pending traffic that has similar network requirements can be provided to specific tuning engines of tuning system 430 to tune for those network requirements. Such tuning engines can be specific to or configure to tune traffic tuning parameters related to those network requirements. For example, if the pending traffic includes a QoS requirement, related traffic data can be provided to a tuning engine that accesses QoS preferences of a traffic scheduling system and tunes a scheduling plan to satisfy those preferences.

Tuning system 430 includes one or more tuning engines (tuning engines 431-439) that generate scheduling plans tuned for traffic tuning parameters. A tuning engine is a combination of hardware and software that tunes scheduling plans according to a traffic tuning parameter. As discussed above, scheduling plans such as initial scheduling plans can be provided to tuning system 430 and tuned to generate tuned scheduling plans. In other implementations, information about network requirements of pending traffic is provided to tuning system 430, and tuning system 430 generates initial scheduling plans from this information (or traffic data) and tunes these initial scheduling plans to generate tuned scheduling plans.

Tuning engines of a tuning system can tune scheduling plans for a variety of traffic tuning parameters such as power consumption, traffic latency, bandwidth, availability, security, QoS, and/or other traffic tuning parameters. Tuning engines can receive or access traffic tuning parameters within policies. For example, a tuning engine can receive or access a policy (not illustrated in FIG. 4) that includes traffic tuning parameters specific to that tuning engine or some property of that tuning engine. As a specific example, a tuning engine can be configured to tune a particular level of a scheduling plan, such as a level of a scheduling plan discussed below in relation to FIGS. 16 and 18A-18E. That tuning engine can access a policy including traffic tuning parameters for that level of the scheduling plan. The tuning engine can tune that level of the scheduling plan using the traffic tuning parameters from the policy.

Additionally, a tuning system can store and/or access a current scheduling plan for a traffic scheduling system as illustrated in FIG. 4. A tuning engine of the tuning system can access a level of the scheduling plan and tune that level of the scheduling plan using traffic tuning parameters for that level of the scheduling plan. In other words, the tuning engine can receive information about pending traffic (e.g., incremental information about pending traffic as discussed in more detail below) and access a level of a current scheduling plan and a policy including traffic tuning parameters for that level. The tuning engine can then tune that level of the scheduling based on the information about the pending traffic and traffic tuning parameters. The tuning engine can update the level of the current scheduling plan within the current scheduling plan. In other words, the current scheduling plan can be incrementally updated with the level of the current scheduling plan tuned by the tuning engine. Moreover, the level of the current scheduling plan and/or the current scheduling plan can be output from the tuning engine to, for example, another tuning engine and/or an analysis engine.

As discussed above, a traffic scheduling system can group traffic by its specific needs based on traffic tuning parameters. Thus, groups of traffic data or scheduling plans with requirements related to common traffic tuning parameters can be provided to tuning engines for those traffic tuning parameters. The tuned scheduling plans output from tuning engines are then combined at analysis engine 440, with the tuned scheduling plans of some groups taking priority over other groups, to define a current scheduling plan. In some implementations, tuning is performed in series at multiple tuning engines that consider priority of traffic tuning parameters and tuning engines using those traffic tuning parameters to define a preferred scheduling plan from various priority plans. In some such implementations, an analysis engine may be omitted. Additional details regarding examples of the operation and structure of tuning engines are discussed below in connection with FIGS. 8-14.

In some implementations, aggregation engine 420 provides traffic data and/or initial scheduling plans for the same pending traffic to multiple traffic engines at tuning system 430 to tune scheduling plans for that pending traffic according to multiple traffic tuning parameters. More specifically, aggregation engine 420 can provide traffic data and/or initial scheduling plans for the same pending traffic to a traffic engine to tune that pending traffic for energy conservation and to another traffic engine to tune that pending traffic for high availability. In such implementations, a traffic identifier can be associated with the traffic data, with the initial scheduling plans provided to each scheduling engine, and with the tuned scheduling engines generated from those traffic data and/or initial scheduling plans to identify tuned scheduling plans that are associated with the same pending traffic. Tuning system 430 and analysis engine 440 can use such traffic identifiers to identify scheduling plans that represent particular pending traffic and not schedule that pending traffic more than once in a current scheduling plan.

Additionally, as illustrated in FIG. 4, one or more policies 490 including network tuning parameters for tuning engines 431-439 of tuning system 430 and/or analysis engine 440. Tuning system 430, or tuning engine 431-439 of tuning system 430, and/or analysis engine 440 can use the network tuning parameters to define a tuned scheduling plan. In some implementations, the policy from policies 490 provided to each of tuning engines 431-439 of tuning system 430 and/or analysis engine 440 (or analysis sub-engines of analysis engine 440) can be related to a specific level of a scheduling plan. Accordingly, tuning engines 431-439 and analysis engine 440 can access specific network tuning parameters for tuning engines 431-439 and analysis engine 440.

Tuned scheduling plans are output from tuning system 430 and provided to analysis engine 440. Analysis engine 440 analyzes the tuned scheduling plans and traffic tuning parameters such as global traffic tuning parameters that apply globally within a traffic scheduling system to define a current scheduling plan for all the pending traffic for the network. That is, analysis engine 440 combines tuned scheduling plans (or portions thereof) or selects a tuned scheduling plan that best satisfies both the individual parameters, which may be used at multiple tuning engines, and global parameters of the traffic scheduling system among the tuned scheduling plans. For example, the current scheduling plan can be a scheduling plan that is a combination of or selected from the tuned scheduling plans and optimally according to some preference satisfies traffic tuning parameters based on, for example, priorities among traffic tuning parameters specific to tuning parameters or pending traffic and global traffic tuning parameters.

Additionally, in some implementations, tuning system 430 provides rules (not shown) to analysis engine 440 that describe how the tuned scheduling plans were generated from other scheduling plans. Analysis engine 440 can access these rules to determine the decisions made by tuning system 430, and analyze the scheduling plans in the context of those decisions. An example of such rules is discussed below in relation to FIG. 17.

Moreover, analysis engine 440 can include a hierarchical structure of analysis sub-engines that are related to particular tuning engines of tuning system 430. For example, analysis sub-engines that are specific or particular to certain traffic tuning parameters and/or levels of a scheduling plan can receive tuned scheduling plans from tuning engines that are also specific or particular to those traffic tuning parameters. Such analysis sub-engines can define a scheduling plan that are input to one or more other analysis sub-engines to define a current scheduling plan. In other words, each analysis sub-engine in the hierarchy can analyze scheduling plans received from tuning engines or other analysis sub-engines and can access parameters or logic to analyze those scheduling plans. Additionally, analysis sub-engines can output a scheduling plan to another analysis sub-engine for further analysis, with the final analysis sub-engine in the hierarchy defining the current scheduling plan.

In some implementations, analysis engine 440 provides the current traffic plan to tuning system 430, which can subsequently generate tuned scheduling plans based on the current traffic plan. For example, the current traffic plan can represent all the pending traffic for a network. Tuning system 430 can periodically receive incremental information about pending traffic (e.g., traffic data or one or more scheduling plans) from aggregation engine 420 or from SDN applications 411-419 related to a portion of the network. For example, tuning system 430 can periodically receive incremental information indicating that a flow will be added to or removed from the network. One or more scheduling plans derived from this information can be tuned and combined with the current scheduling plan to define tuned scheduling plans. In some implementations, the one or more scheduling plans can be combined with the current scheduling plan and tuned to define tuned scheduling plans. The scheduling plans can then be provided to analysis engine 440 as discussed above.

As discussed above, in some implementations tuning engines access policies and levels of a current scheduling plan specific to those levels of a current scheduling plan to tune a scheduling plan (or levels of a scheduling plan). Similarly, in some implementations an analysis engine (or analysis sub-engines of an analysis engine) can access policies and levels of a current scheduling plan specific to those levels of a current scheduling plan to analyze one or more levels of a scheduling plan and define one or more levels of the scheduling plan. In other words, analysis sub-engines in a hierarchy of analysis sub-engines of an analysis engine can be specific to levels of a scheduling plan. Each analysis sub-engine can analyze scheduling plans received from tuning engines using a policy specific to the level with which that analysis sub-engine is associated and information in a corresponding level of a current scheduling plan. Thus, each analysis sub-engine can define a level of a scheduling plan independent of other analysis sub-engines and levels of the scheduling plan. Accordingly, each analysis sub-engine can define a level of a scheduling plan to incrementally update a current scheduling plan.

As illustrated in FIG. 4, the current traffic plan defined at analysis engine 440 is provided to deployment engine 450. Deployment engine 450 interprets the current scheduling plan and generates network configuration instructions to configure network resources to realize or implement the scheduling plan. For example, deployment engine 450 determines from the current scheduling plan how network resources should be configured to realize the current scheduling plan. Such information about the configuration of network devices can be accessed from a current scheduling plan that describes pending traffic and which network devices should handle that traffic in a time domain as discussed below in relation to FIGS. 16 and 18A-18E.

Deployment engine 450 then generates network configuration instructions such as Openflow® commands for each network resource that when implemented at the network resources cause the network resources to realize the current scheduling plan. The network configuration instructions for each network resource (e.g., network resources 461-469) are then provided to those network resources. For example, the network configuration instructions can be provided to network resources via an SDN controller (not shown) and a control plane of a network.

Figure 7:
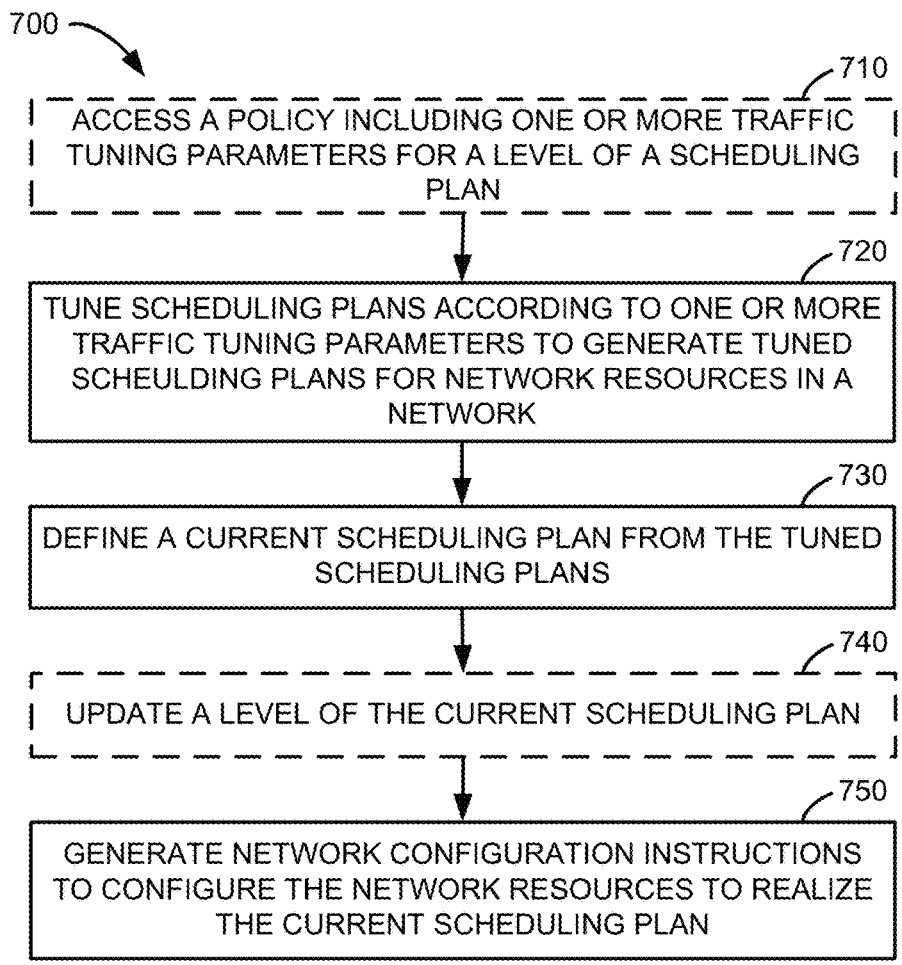
FIG. 7 is a flowchart of a network scheduling process, according to an implementation.

FIG. 7 is a flowchart of a network scheduling process, according to an implementation. Process 700 is as example of a network scheduling process. In other implementations, a network scheduling process can include more, fewer, or rearranged blocks (or steps). Similar to process 300 illustrated in FIG. 3, process 700 can be implemented at a traffic scheduling system hosted at any of a variety of hosts. For example, process 700 can be hosted at (or implemented by) a tuning system and a deployment engine of a traffic scheduling system. Blocks 710 and 740 of process 700 are illustrated in dashed lines to highlight that these blocks are not implemented in some implementations. One example will be discussed in relation to blocks 720, 730, and 750; and another example will be discussed in relation to these blocks and blocks 710 and 740.

Scheduling plans are tuned according to one or more traffic tuning parameters to generate tuned scheduling plans for network resources in a network at block 720. As examples, scheduling plans can be tuned according to traffic tuning parameters such as: latency to prefer paths through the network with high link speeds, shortest distances, fewest hops, switches with lowest store and forward delays, and other properties related to latency; security by preferring MACSEC links, fibre over copper, paths intrusion prevention systems (IPS), and/or switches with IPS functionality; high availability (HA) by preferring paths with physical layer redundancy, switches with high reliability, creating copies of data packets and transmitting these copies via different paths and eliminating the redundant data packets at the last switch in the path; jitter by selecting paths or network resources with low jitter; energy consumption be selecting paths with energy efficient links or network resources and/or defining paths and timing configurations of network resources and/or data packets described in a scheduling plan to increase the length and/or quantity of inactive periods for network resources; other traffic tuning parameters; and/or combinations thereof.

Scheduling plans can be tuned to generate tuned scheduling plans by generating options for pending traffic (e.g., from information about the pending traffic such as traffic data describing the pending traffic and network requirements of the pending traffic and/or scheduling plans that describe the pending traffic) using descriptions of the network infrastructure such as which network resources are available to handle the pending traffic and operational modes or capabilities of those network resources such as energy conservation modes. Additionally, preferences can be accessed and considered when generating options for the pending traffic.

Such options can be described in potential scheduling plans. Potential scheduling plans are scheduling plans that are generated from various combinations of network resources (e.g., various network paths within a network) and configuration of those network resources that differ one from another and satisfy network requirements of pending traffic. Thus, as part of generating tuned scheduling plans, multiple potential scheduling plans can first be generated.

As a specific example, to generate potential scheduling plans for an energy conservation traffic tuning parameter, various combinations of network resources and spacing of data packets that satisfy timing requirements of pending traffic and have long inactive periods between data packets (or groups of data packets) can be generated as potential scheduling plans. The various combinations of network resources represent different paths through the network. That is, each potential scheduling plan describes a combination of paths and traffic spacing to increase inactive periods of network devices and reduce energy consumption in the network.

The potential scheduling plans are then compared using preferences for objectives of tuning (e.g., preferences related to the traffic tuning parameter or parameters scheduling plans are being tuned), and a tuned scheduling plan that best (according to some measure for the tuning) satisfies those objectives is defined. The tuned scheduling plan can be a combination or amalgamation of multiple potential scheduling plans or can be a potential scheduling plan that is selected as best satisfying the objectives. Additional details of tuning are discussed below in relation to FIGS. 8-14.

Similarly to blocks 340 and 350 discussed above in relation to FIG. 3, a current scheduling plan is defined from the tuned scheduling plan at block 730. For example, the scheduling plans used to generate tuned scheduling plans at block 720 can be the initial scheduling plans generated at block 330 of FIG. 3, and the scheduling plans derived from the initial scheduling plans discussed in relation to block 340 of FIG. 3 can be the tuned scheduling plans generated at block 720. In other words, in some implementations, block 720 can be implemented between blocks 330 and 340 of FIG. 3.

Network configuration instructions such as Openflow® commands or other instructions to configure network resources are generated at block 750. These network configuration instructions can be provided to the network resources to cause the network resources to realize (or implement) the current scheduling plan. That is, after these network configuration instructions have been provided (or deployed) to the network resources and the network resources have configured themselves according to these network configuration instructions, the network implements the scheduling plan. For example, as discussed above in relation to deployment engine 450 of FIG. 4, the current scheduling plan can be interpreted at block 750 and network configuration instructions to configure network resources to realize or implement the current scheduling plan can be generated based on the current scheduling plan.

As discussed above, in some implementations process 700 accesses a policy including one or more traffic tuning parameters for a level of a scheduling plan at block 710. The one or more traffic tuning parameters included in the policy accessed at block 710 can be the one or more traffic tuning parameters used at block 720 to generate tuned scheduling plans. Moreover, in some implementations, block 710 can be repeated (either serially or in parallel) at each of a group of tuning engines of a tuning system. Each tuning engine can be specific to a level of a scheduling plan, and can access a policy including one or more traffic tuning parameters for that level of a scheduling plan. Each tuning engine can then generate a tuned level of a scheduling plan at block 720 to collectively generate a tuned scheduling plan. Also at step 710, the current scheduling plan, limited to the scope of this level, is examined to generate tuned traffic plans by learning about the past scheduling plan.

In some implementations, a tuned scheduling plan is generated incrementally at block 720. For example, some of the tuning engines receive incremental information about pending traffic and generate tuned levels of the scheduling plan based on the incremental information about pending traffic for the tuned scheduling plan. Other tuning engines do not receive information about pending traffic, and levels of a current scheduling plan are used in the tuned scheduling plan for the levels corresponding to those tuning engines that do not receive information about pending traffic.

Additionally, in some implementations a current scheduling plan is updated at block 740. For example, levels of a scheduling plan that are tuned at block 720 are updated in the current scheduling plan. As a specific example, process 700 can update portions of a data structure stored at memory that correspond to levels of the current scheduling plan. In this example, tuning engines associated with each level of the current scheduling plan can update portions of the data structure corresponding to those levels. Such implementations can allow efficient incremental updates to a current scheduling plan by updating only the levels of that current scheduling corresponding to incremental information about pending traffic for a network.

Figure 8:
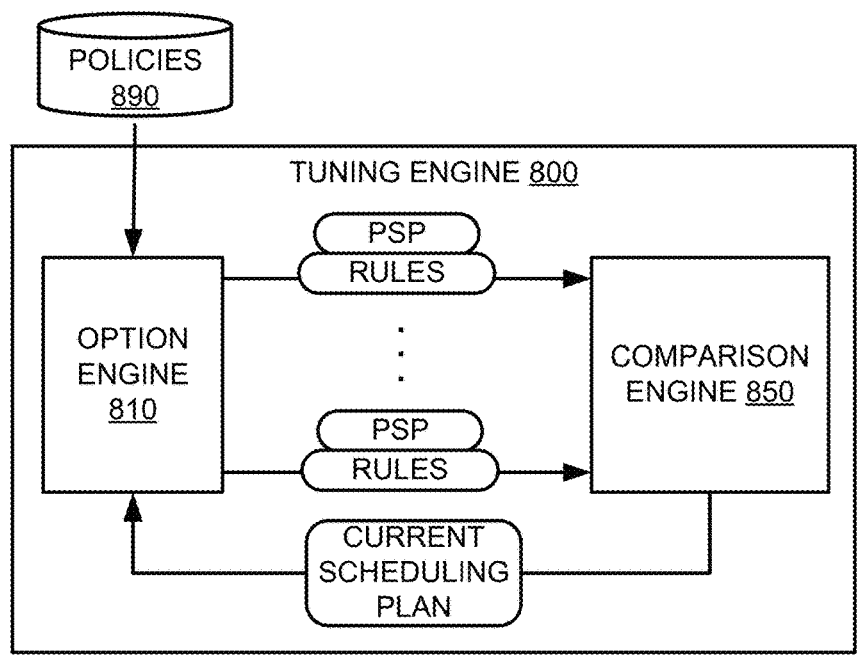
FIGS. 8 and 9 are schematic block diagrams of a tuning engine, according to an implementation.
Figure 9:
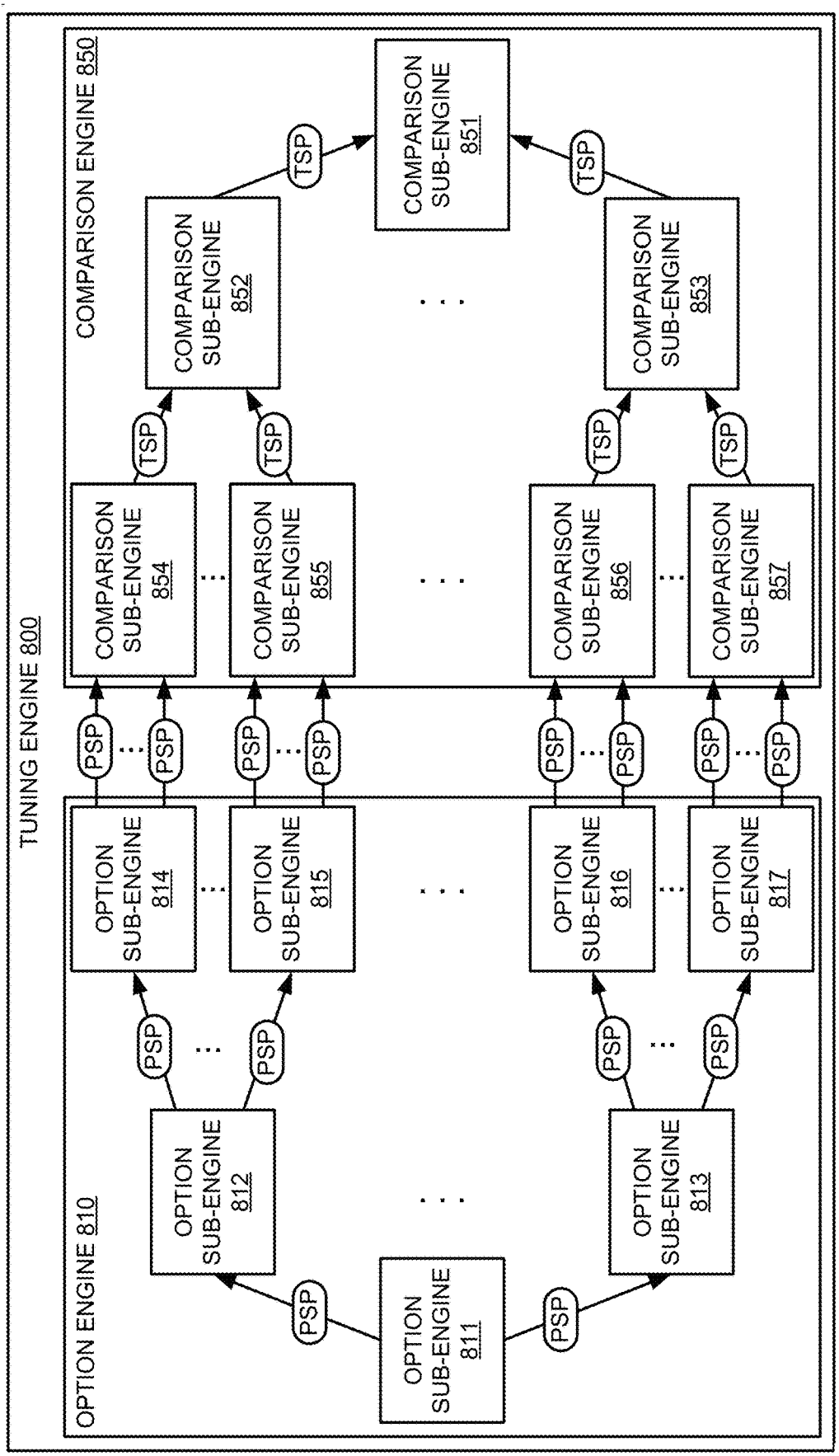

FIGS. 8 and 9 are schematic block diagrams of a tuning engine, according to an implementation. Tuning engine 800 includes option engine 810 and comparison engine 850. Option engine 810 is a combination of hardware and software that generating options for pending traffic. For example, option engine 810 can receive information about the pending traffic such as traffic data describing the pending traffic and network requirements of the pending traffic and/or scheduling plans that describe the pending traffic. Additionally, option engine 810 can access descriptions of the network infrastructure to generate potential scheduling plans that represent various combinations of network resources available to handle the pending traffic using operational modes or capabilities of those network resources that satisfy the network requirements of the pending traffic. In some implementations, preferences are accessed and considered by option engine 810 when generating options for the pending traffic to limit the combinations of network resources and operational modes or capabilities of those network resources represented in potential scheduling plans to those that satisfy network requirements of the pending traffic and the preferences.

Option engine 810 provides potential scheduling plans (labeled PSP in FIG. 8) and rules that describe how the potential scheduling plans were generated are provided to comparison engine 850. Comparison engine 850 is a combination of hardware and software that compares potential scheduling plans based on information included within the potential scheduling plans and associated rules, and defines a tuned scheduling plan that satisfies an objective for the tuning engine. For example, the tuning engine can be related to a traffic tuning parameter and the objective can be to best satisfy (or meet) that traffic tuning parameter. Comparison engine 850 can compare the potential scheduling plans using, for example, preferences for objective and define a tuned scheduling plan.

The tuned scheduling plan can be defined by selecting the tuned scheduling plan from the potential scheduling plans. Alternatively, comparison engine 850 can compare the potential scheduling plans and select portions of various potential scheduling plans to aggregate or combine to define the tuned scheduling plan. For example, comparison engine 850 can combine portions of multiple potential scheduling plans to define a tuned scheduling plan that best satisfies objectives of tuning engine 800. That is, comparison engine 850 can combine portions of multiple potential scheduling plans to define a tuned scheduling plan according to some preference accessed by tuning engine 800.

As illustrated in FIG. 8, one or more policies 890 including network tuning parameters for option engine 810 are accessed by option engine 810. The network tuning parameters used at option engine 810 to define potential scheduling plans can be those included at policies 890. In some implementations, the network tuning parameters can be related to a specific level of a scheduling plan associated with option engine 810. Additionally, option engine 810 can access a current scheduling plan, or one or more levels of a current scheduling plan, defined at comparison engine 850. Option engine 810 can use information in the current scheduling plan, or one or more levels thereof, to generate potential scheduling plans from incremental information about pending traffic. That is, option engine 810 can combine information from the current scheduling plan such as information about a scheduling plan level with which option engine 810 is associated with incremental information about pending traffic to generate potential scheduling plans.

As illustrated in FIG. 9, tuning engine 800 can include additional components than illustrated in FIG. 8. Rules have not been illustrated from the example illustrated in FIG. 9. Other implementations can include rules as discussed in other examples herein. Moreover, tuning engine 800 is illustrated logically in FIG. 9. Thus, some components (e.g., sub-engines) of tuning engine 800 can be implemented at different physical devices. For example, some sub-engines can be implemented at an ASIC or at multiple ASICs. As another example, some sub-engines can be implemented as instructions on a non-transitory computer readable medium (e.g., a memory) and hosted at a processor or computing system. As a specific example, some sub-engines can be hosted at a computing system within a virtual machine (VM). As yet another example, tuning engine 800 can be distributed such that tuning engine 800 includes sub-engines that are implemented according to multiple of these examples.

Although particular engines (i.e., combinations of hardware and software) are illustrated and discussed in relation to tuning engine 800 specifically and other example implementations discussed herein generally, other combinations or sub-combinations of engines can be included within other implementations. Said differently, although engines illustrated in FIG. 9 and discussed in other example implementations perform specific functionalities in the examples discussed herein, these and other functionalities can be accomplished, implemented, or realized at different engines or at combinations of engines.

For example, two or more engines illustrated and/or discussed as separate can be combined into an engine that performs the functionalities discussed in relation to the two engines. As another example, functionalities performed at one engine as discussed in relation to these examples can be performed at a different engine or different engines. Moreover, an engine discussed herein in relation to a particular type of engine can be implemented as a different type of engine in other implementations. For example, a particular engine can be implemented using a group of electronic and/or optical circuits (or logic circuitry) or as instructions stored at a non-transitory processor-readable medium such as a memory and executed at a processor.

As illustrated in FIG. 9, option engine 810 includes option sub-engines 811-817 and comparison engine 850 includes comparison sub-engines 851-857. As illustrated by the ellipses, option engine 810 can include additional option sub-engines and comparison engine 850 can include additional comparison sub-engines in various implementations. Option sub-engines perform the functionalities of an option engine as discussed above in relation to FIG. 8, and each option sub-engine can generate potential scheduling plans (labeled PSP in FIG. 9) using different preferences, traffic tuning parameters, logic, combinations of network resources (e.g., paths through a network), operational modes or capabilities of network resources, or other criteria or objectives. Option sub-engine 811 receives information about pending traffic (e.g., descriptions of pending traffic or scheduling plans such as initial scheduling plans) and generates potential scheduling plans that are provided to option sub-engines 812 and 813, and other option sub-engines in some implementations. In the example illustrated in FIG. 9, a unique potential scheduling plan is provided from option sub-engine 811 to option sub-engines 812 and 813. That is, the potential scheduling plan provided to option sub-engine 812 is distinct from the potential scheduling plan provided to option sub-engine 813. In other implementations, potential scheduling plans provided to one option sub-engine are also provided to one or more other option sub-engines.

Similarly, the potential scheduling plans generated by option sub-engine 812 are provided to option sub-engines 814-815, and other option sub-engines in other implementations. The potential scheduling plans generated by option sub-engine 832 are likewise provided to option sub-engines 816-817, and other option sub-engines in other implementations. The potential scheduling plans generated by option engine 810 (the potential scheduling plans generated by option sub-engines 814-817 in this example) are then provided to comparison engine 850. As discussed above, different option sub-engines can generate potential scheduling plans using different methodologies. Accordingly, implementations such as that illustrated in FIG. 9 allow an option engine of a tuning engine to generate potential scheduling plans (or options for scheduling pending traffic) according to various methodologies.

Comparison engine 850 includes comparison sub-engines 851-857. Comparison sub-engines perform the functionalities of a comparison engine, and each comparison sub-engine can generate tuned scheduling plans (labeled TSP in FIG. 9) using different preferences, logic, or other criteria or objectives. In some implementations, as illustrated in FIG. 9 each comparison sub-engine is matched or corresponding with an option sub-engine. Comparison sub-engines and option sub-engines that are matched can be positioned within an option engine and comparison engine such that scheduling plans derived from potential scheduling plans output by an option sub-engine are received by a comparison sub-engine matched with that option sub-engine. Moreover, comparison sub-engines and option sub-engines that are matched can access and utilize similar preferences, logic, or other criteria or objectives to define and generate scheduling plans. As an example, option sub-engine 812 and comparison sub-engine 852 can be said to be matched, and can access and utilize similar preferences, logic, or other criteria or objectives to define and generate scheduling plans.

Comparison sub-engines 854-857 receive potential scheduling plans from option sub-engines 814-817, as illustrated in FIG. 9. Although FIG. 9 illustrates each of comparison sub-engines 854-857 receiving potential scheduling plans from one of option sub-engines 814-817, potential scheduling plans can be provided from option sub-engines 814-817 to other combinations of comparison sub-engines 854-857 or even to each of comparison sub-engines 854-857 in other implementations.

Comparison sub-engines 854-857 define tuned scheduling plans and provide those tuned scheduling plans to comparison sub-engines 852 and 853. As discussed above in relation to option sub-engines 811-817, although each of comparison sub-engines 854 and 855 provides a tuned scheduling plan to comparison sub-engine 852 and comparison sub-engines 856 and 857 provides a tuned scheduling plan to comparison sub-engine 853 in the example illustrated in FIG. 9, tuned scheduling plans can be provided from each of comparison sub-engines 854-857 to each of comparison sub-engines 852 and 853 or in other combinations in other implementations.

Tuned scheduling plans are then provided from comparison sub-engines 852 and 853, and other comparison sub-engines in some implementations, to comparison sub-engine 851. Comparison sub-engine 851 the defines a tuned scheduling plan for tuning engine 800, for example, as discussed above.

In the example illustrated in FIG. 9, comparison engine 850 includes comparison sub-engines that are structured symmetrically with the option sub-engines of option engine 810. In other implementations, comparison sub-engines and option sub-engines are structure asymmetrical with respect to one another. Moreover, although not illustrated in FIG. 9, one or more of options sub-engines can receive a scheduling plan output from a corresponding comparison sub-engine. With reference to FIG. 9, option sub-engine 811 can receive a tuned scheduling plan from comparison sub-engine 851. This scheduling plan can be used as a current scheduling plan as discussed above in relation to FIGS. 4 and 7 for incremental tuning of scheduling plans. That is, each option sub-engine that accesses a scheduling plan output from a corresponding comparison sub-engine can use that scheduling plan to incrementally generate potential scheduling plans for incremental information about changes in pending traffic for one portion of a network.

Moreover, option sub-engines and comparison sub-engines can accesses policies defining traffic tuning parameters, and use those traffic tuning parameters to define potential scheduling plans and select tuned scheduling plans. Similarly as discussed above in relation to FIGS. 4 and 7, option sub-engines and comparison sub-engines can be associated with levels of a scheduling plan, and the policies accessed by each option sub-engine and comparison sub-engine can be specific to the level of the scheduling plan associated with that option sub-engine or comparison sub-engine. Additionally, the option sub-engines and comparison sub-engines can access levels of a current scheduling plan rather than a complete current scheduling plan, and generate potential scheduling plans and select or define tuned scheduling plans for those levels. Such features allow a tuning engine to tune scheduling plans without tuning an entire scheduling plan. That is, a tuning engine can incrementally tune scheduling plans level by level based on incremental information about pending traffic associated with those levels.

Figure 10:
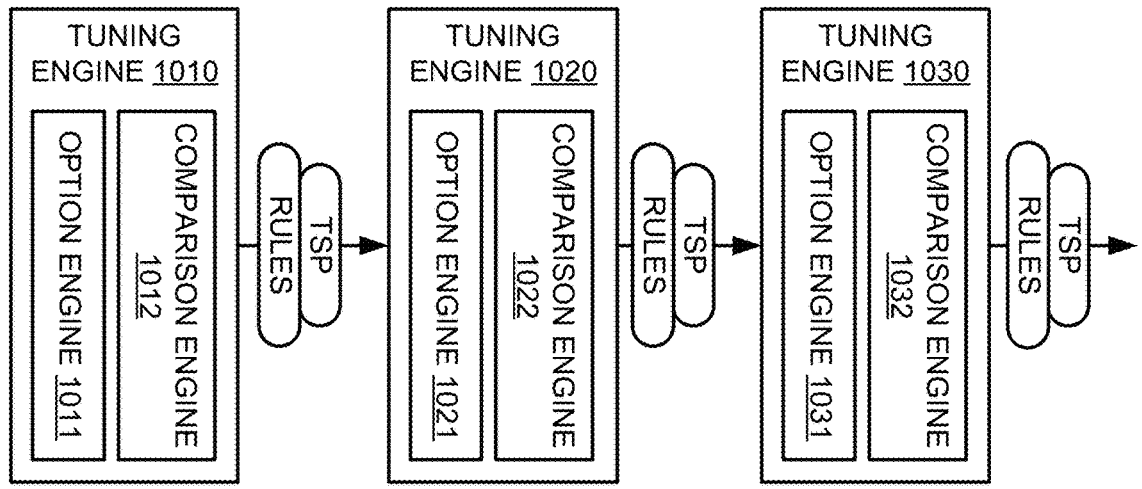
FIG. 10 is a schematic block diagram of a tuning system, according to an implementation.

FIG. 10 is a schematic block diagram of a tuning system, according to an implementation. The tuning system illustrated in FIG. 10 includes three tuning engines: tuning engine 1010, tuning engine 1020, and tuning engine 1030. Other combinations of tuning engines can be implemented in various implementations. Each of tuning engine 1010, tuning engine 1020, and tuning engine 1030 includes an option engine and comparison engine (option engine 1011 and comparison engine 1012, option engine 1021 and comparison engine 1022, and option engine 1031 and comparison engine 1032, respectively) operate as other tuning engines discussed herein. Although not illustrated in FIG. 10 for clarity, each of option engines 1011, 1021, and 1031 can access policies including network tuning parameters, for example as discussed above in relation to FIG. 8. Additionally, option engines 1011, 1021, and 1031 can access current scheduling plans, or portions thereof, from comparison engines 1012, 1022, and 1032, respectively.

Additionally, each of tuning engine 1010, tuning engine 1020, and tuning engine 1030 is related to (e.g., tunes for) a traffic tuning parameter with an associated priority. The traffic tuning parameter related to tuning engine 1030 has a higher priority than the traffic tuning parameter related to tuning engine 1020, which has a higher priority than the traffic tuning parameter related to tuning engine 1010. In other words, as illustrated by the flow of tuned scheduling plans (labeled TSP in FIG. 10) and rules, tuning engine 1010, tuning engine 1020, and tuning engine 1030 are arranged in order of ascending priority of related traffic tuning parameters.

This ordering allows tuning engines related to higher priority traffic tuning parameters to tune scheduling plans that modify the tuning performed by tuning engines related to lower priority traffic tuning parameters. As an example with reference to FIG. 10, tuning engine 1010 receives information about pending traffic for a network and generates a tuned scheduling plan according to its related traffic tuning parameter, and outputs that tuned scheduling plan and rules that describe how (e.g., according to which preferences, network requirements, or other criteria) the tuned scheduling plan was generated. That tuned scheduling plan and related rules are provided to tuning engine 1020, which generates a tuned scheduling plan according to its related traffic tuning parameter from the tuned scheduling plan and rules received from tuning engine 1010. Because tuning engine 1020 is related to a traffic tuning parameter with higher priority than that of tuning engine 1010, tuning engine 1020 may generate a tuned scheduling plan that changes, reverses, or eliminates some characteristics of the tuned scheduling plan output from tuning engine 1010. Tuning engine 1020 then outputs that tuned scheduling plan and rules that describe how the tuned scheduling plan was generated to tuning engine 1030.

Similarly, that tuned scheduling plan and related rules are received at tuning engine 1030, which generates a tuned scheduling plan according to its related traffic tuning parameter from the tuned scheduling plan and rules received from tuning engine 1020. Because tuning engine 1030 is related to a traffic tuning parameter with higher priority than that of tuning engine 1020, tuning engine 1030 may generate a tuned scheduling plan that changes, reverses, or eliminates some characteristics of the tuned scheduling plan output from tuning engine 1020. Tuning engine 1030 then outputs that tuned scheduling plan and rules that describe how the tuned scheduling plan was generated.

Figure 11:
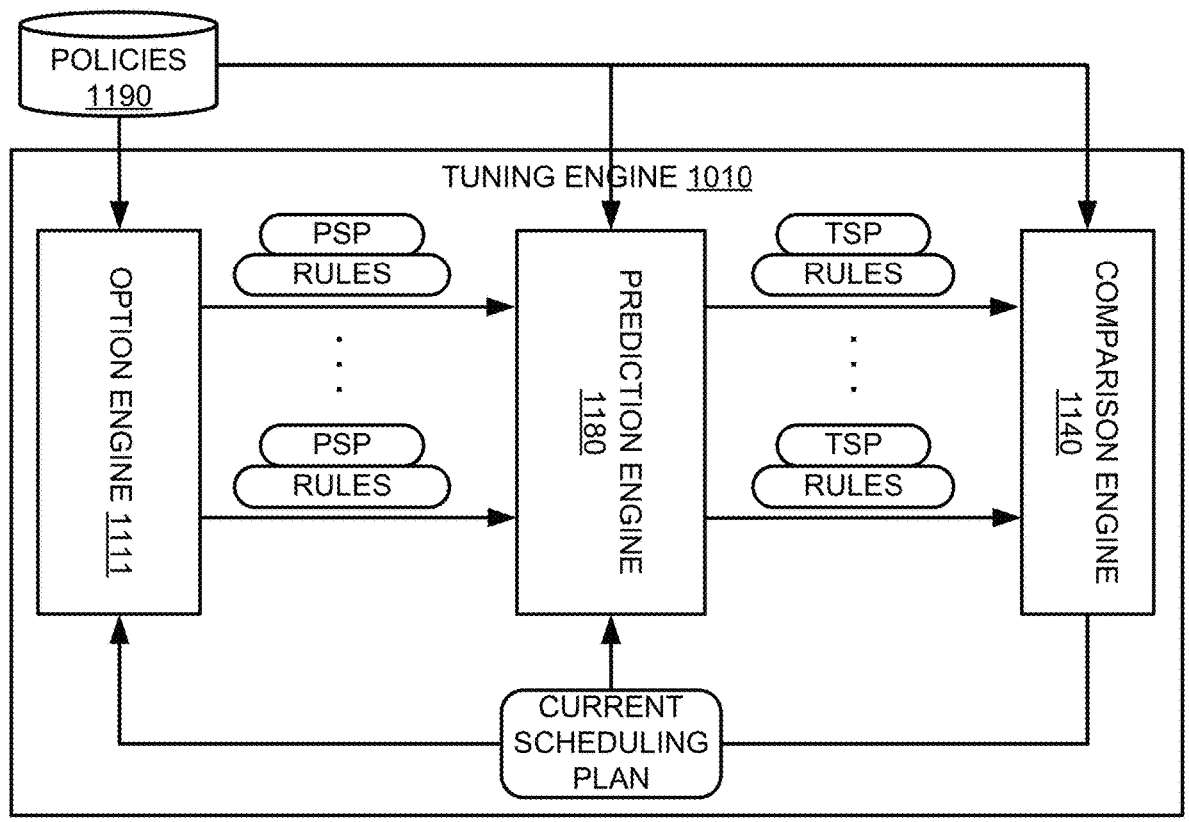
FIG. 11 is a schematic block diagram of a tuning engine of the tuning system illustrated in FIG. 10, according to an implementation.

FIG. 11 is a schematic block diagram of a tuning engine of the tuning system illustrated in FIG. 10, according to an implementation. In the example illustrated in FIG. 11, tuning engine 1010 includes prediction engine 1180. A prediction engine is a combination of hardware and software that determines the effect of other tuning engines (e.g., tuning engines related to higher priority traffic tuning parameters) on potential scheduling plans of a tuning engine.

A tuning engine including a prediction engine can use this information to define a tuned scheduling plan that will include one or more properties or characteristics after it is tuned by other tuning engines. For example, a prediction engine can define tuned scheduling plans based on scheduling plans generated by an option engine (e.g., potential scheduling plans) that are based on (or tuned according to) traffic tuning parameters that have a higher priority than a traffic tuning parameter related to the tuning engine including the predication engine. Said differently, a prediction engine of a tuning engine can apply traffic tuning parameters related to other tuning engines to scheduling plans within that tuning engine.

As discussed above in relation to FIG. 10 and other examples, sub-engines of a tuning engine (e.g., option engines and/or comparison engines) can access levels of a current scheduling plan (i.e., a previously defined or past scheduling plan) and policies such as policies 1190 including traffic tuning parameters associated with those levels. Similarly, one or more prediction engines of a tuning engine can access levels of a current scheduling plan and policies including traffic tuning parameters associated with those levels. As a specific example, a sub-engine or prediction engine of a tuning engine can be associated with a level of a scheduling plan, and can access that level of a current scheduling plan and policies including traffic tuning parameters associated with that level to define a tuned scheduling plan. Said differently, the traffic tuning parameters used by a sub-engine or prediction engine of a tuning engine can be specific to the level of a scheduling plan with which that sub-engine or prediction engine is associated.

Such level-specific tuning of scheduling plans allows incremental tuning of scheduling plans. That is in response to receipt of incremental information about pending traffic, a tuning engine can provide that information to sub-engines or other components that are associated with a level of a current scheduling plan affected by that information. Those sub-engines or other components can tune only those levels of the current scheduling plan, rather than the entire scheduling plan. Such implementations can allow for more rapid definition of scheduling plans because only the levels of the current scheduling plan affected by the incremental information are tuned and updated. Thus, such tuning engines can avoid unnecessarily tuning levels of a current scheduling plan that are not impacted by incremental information about pending traffic.

As illustrated in FIG. 11, option engine 1111 provides potential scheduling plans (labeled PSP in FIG. 11) and rules to prediction engine 1180. Prediction engine 1180 generates tuned scheduling plans (labeled TSP in FIG. 11) based on traffic tuning parameters that have a higher priority than a traffic tuning parameter related to tuning engine 1010. For example, prediction engine 1180 can generate tuned scheduling plans based on traffic tuning parameters related to tuning engines 1020 and 1030. These tuned scheduling plans describe the effect of tuning potential scheduling plans for tuning engine 1010 with tuning engines 1020 and 1030. These tuned scheduling plans and related rules are provided to comparison engine 1140, which defines a tuned scheduling plan for tuning engine 1010 that preserves tuning for the traffic tuning parameter related to tuning engine 1010 that will not be reversed or removed during later tuning by tuning engines 1020 and/or 1030.

A prediction engine can generate such tuned scheduling plans according to a variety of methodologies. For example, a prediction engine can implement other tuning engines. That is, a prediction engine can include logic circuitry or modules hosted at a processor to perform the functionalities of other tuning engines. As another example, a prediction engine can communicate with other tuning engines to provide scheduling plans and receive tuned scheduling plans. As yet another example, a prediction engine can share resources such as blocks of logic circuitry with tuning engines. In some implementations, a prediction engine generates tuned scheduling plans using a combination of these and/or other methodologies.

FIGS. 12A-12D are schematic block diagrams of the prediction engine illustrated in FIG. 11, according to various implementations. In other implementations, prediction engines can apply traffic tuning parameters related to other tuning engines in other parallel and/or serial arrangements. The tuning engines are illustrated with broken lines to indicate that the tuning engines are not included within prediction engine 1180 in some implementations. The arrowed lines indicate the flow of scheduling plans, with scheduling plans generated by option engine 1111 provided as input to prediction engine 1180 and tuned scheduling plans output from predication engine 1180 to comparison engine 1140.

Figure 12A:
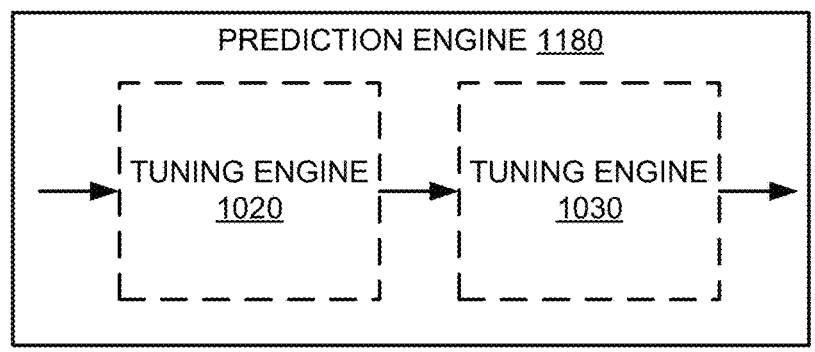
FIGS. 12A-12D are schematic block diagrams of the prediction engine illustrated in FIG. 11, according to various implementations.

FIG. 12A illustrates prediction engine 1180 configured to apply a serial arrangement of traffic tuning parameters to scheduling plans generated by tuning engine 1010 (e.g., potential scheduling plans generated by option engine 1111). In other words, in this example, tuning engines 1020 and 1030 (or functionalities or logic thereof) tune scheduling plans generated by option engine 1111 serially according to the traffic tuning parameters for those tuning engines. Thus, comparison engine 1140 can determine how a combination of tuning engines 1020 and 1030 will alter scheduling plans generated by tuning engine 1010.

Figure 12B:
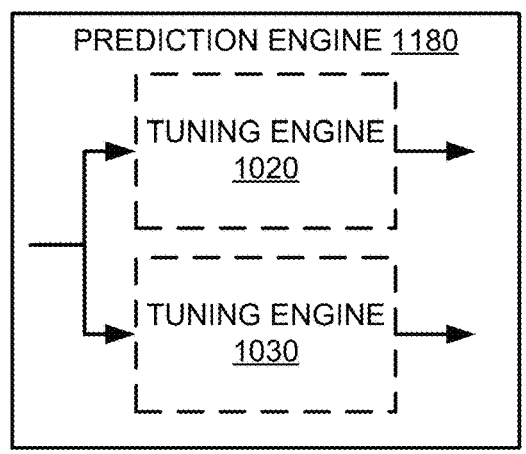

FIG. 12B illustrates prediction engine 1180 configured to apply a parallel arrangement of traffic tuning parameters to scheduling plans generated by tuning engine 1010. In other words, in this example, tuning engines 1020 and 1030 (or functionalities or logic thereof) tune scheduling plans generated by option engine 1111 in parallel according to the traffic tuning parameters for those tuning engines. Thus, comparison engine 1140 can determine how tuning engines 1020 and 1030 will individually alter scheduling plans generated by tuning engine 1010.

Figure 12C:
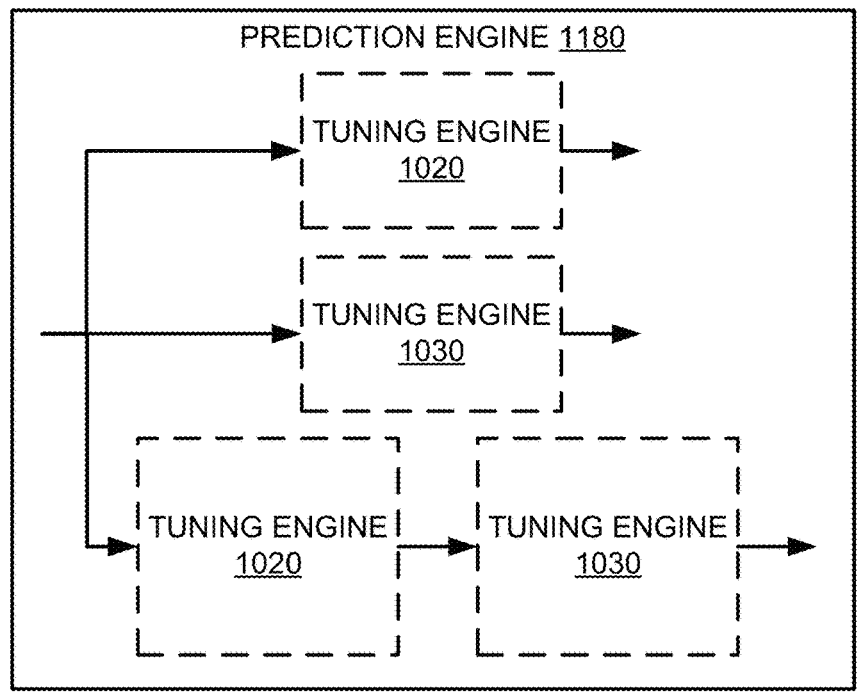

FIG. 12C illustrates prediction engine 1180 configured to apply a parallel arrangement of traffic tuning parameters and a serial arrangement of traffic tuning parameters to scheduling plans generated by tuning engine 1010. In other words, in this example, tuning engines 1020 and 1030 (or functionalities or logic thereof) tune scheduling plans generated by option engine 1111 in parallel and serially according to the traffic tuning parameters for those tuning engines. Thus, comparison engine 1140 can determine how tuning engines 1020 and 1030 will individually and collectively alter scheduling plans generated by tuning engine 1010.

Figure 12D:
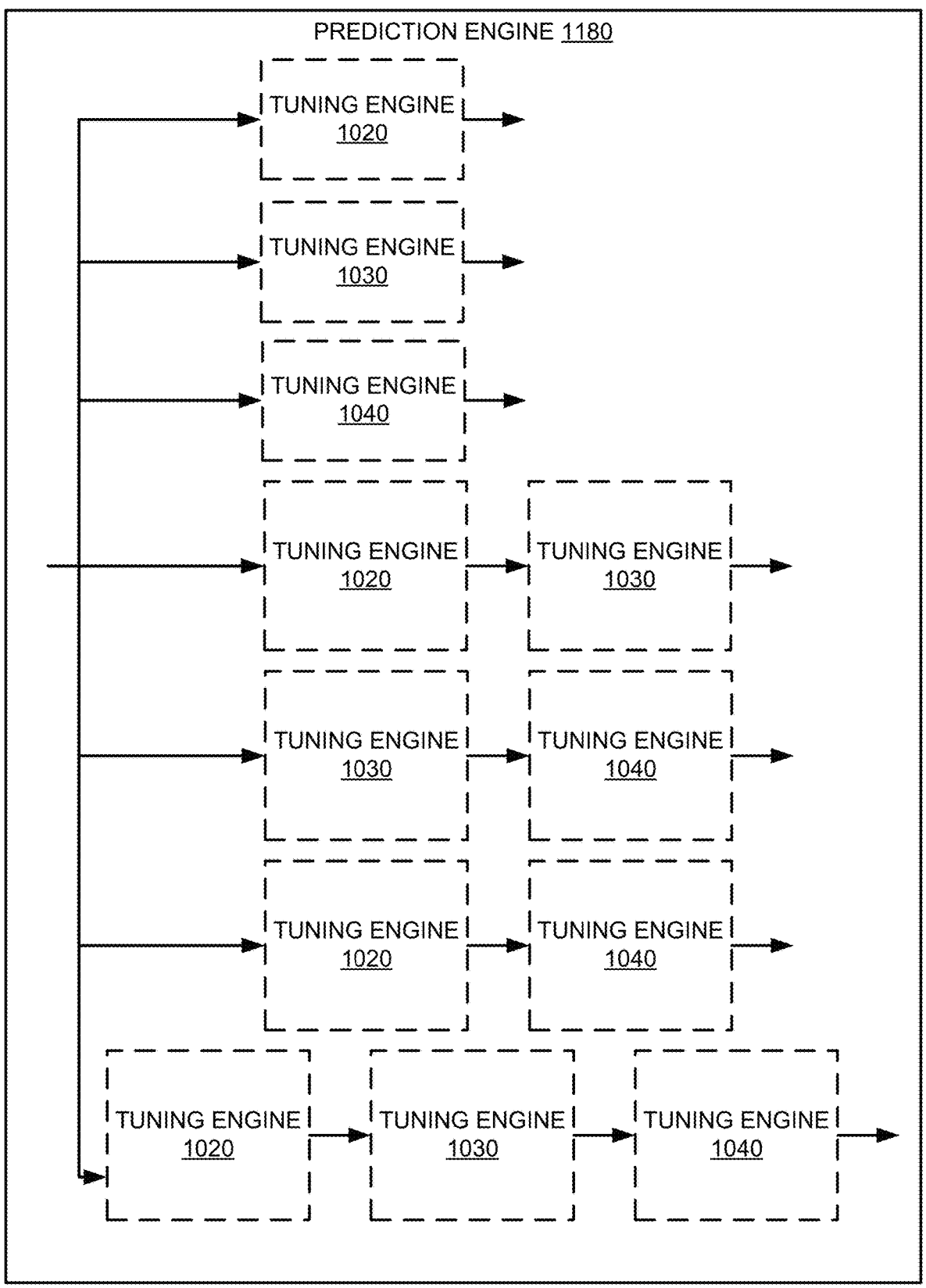

FIG. 12D illustrates prediction engine 1180 configured to apply various parallel and serial arrangements of traffic tuning parameters to scheduling plans generated by tuning engine 1010. To illustrate an increased variety in the parallel and serial arrangements of traffic tuning parameters applied to scheduling plans generated by tuning engine 1010, an additional tuning engine—tuning engine 1040 is introduced. Tuning engine 1040 is related to a traffic tuning parameter with a higher priority than that of tuning engine 1030. Accordingly, in this example, tuning engines 1020, 1030, and 1040 (or functionalities or logic thereof) tune scheduling plans generated by option engine 1111 in parallel and serially according to the traffic tuning parameters for those tuning engines. Thus, comparison engine 1140 can determine how tuning engines 1020, 1030, and 1040 will individually and in various combinations alter scheduling plans generated by tuning engine 1010.

Figure 13:
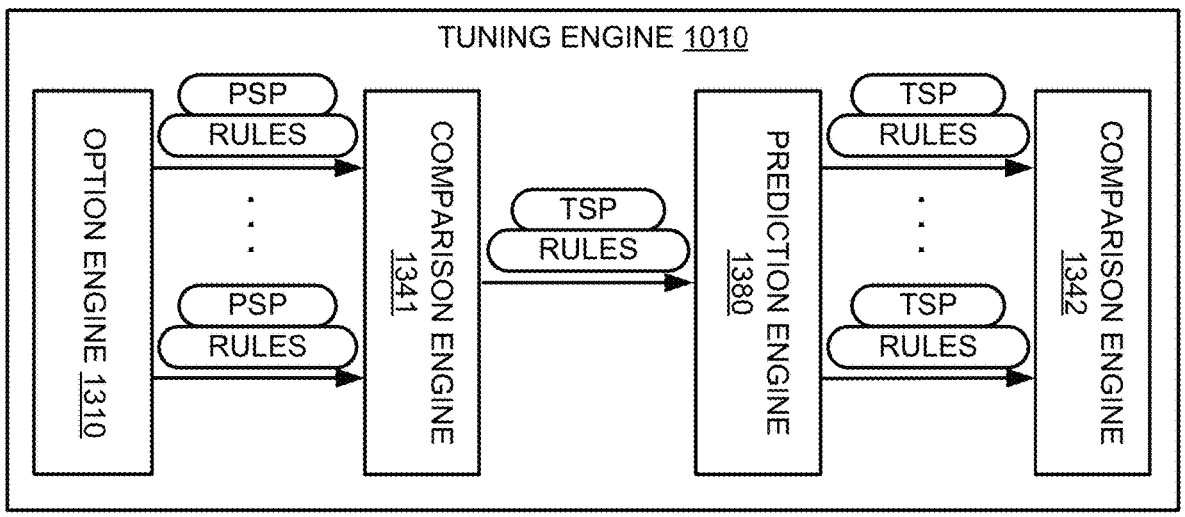
FIGS. 13 and 14 are schematic block diagrams of a tuning engine of the tuning system illustrated in FIG. 10, according to various implementations.
Figure 14:
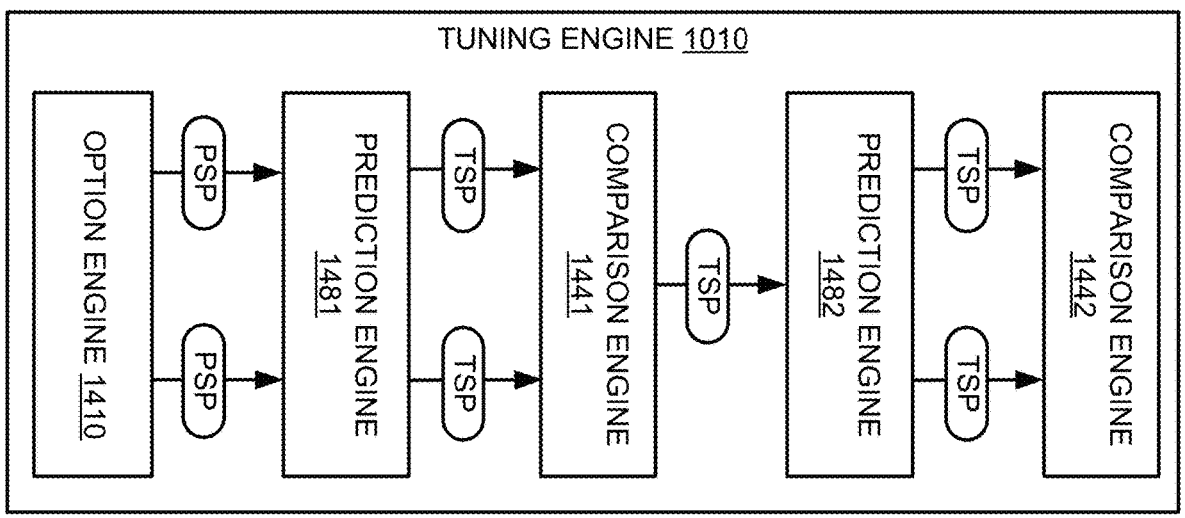

FIGS. 13 and 14 are schematic block diagrams of a tuning engine of the tuning system illustrated in FIG. 10, according to various implementations. The implementations of tuning engine 1010 illustrated in FIGS. 13 and 14 show different arrangements of options engines, comparison engines, and prediction engines than the example illustrated in FIG. 11.

As illustrated in FIG. 13, option engine 1320 outputs potential scheduling plans (labeled PSP) and associated rules, which are received at comparison engine 1341. Comparison engine 1341 generates a tuned scheduling plan (labeled TSP) based on the potential scheduling plans and associated rules output by option engine 1320. This tuned scheduling plan and associated rules are then provide to prediction engine 1380, which applies one or more traffic tuning parameters that are higher in priority than a traffic tuning parameter related to tuning engine 1010. The resulting tuned scheduling plans and associated rules are provided to comparison engine 1342, which defines a tuned scheduling plan for tuning engine 1010 that preserves tuning for the traffic tuning parameter related to tuning engine 1010 that will not be reversed or removed during later tuning by other tuning engines related to the one or more traffic tuning parameters that are higher in priority than a traffic tuning parameter related to tuning engine 1010.

The example illustrated in FIG. 14 excludes rules. However, rules can be included in other implementations. In the example of FIG. 14, option engine 1410 outputs potential scheduling plans (labeled PSP), which are received at prediction engine 1481. Prediction engine 1481 applies one or more traffic tuning parameters that are higher in priority than a traffic tuning parameter related to tuning engine 1010. The resulting tuned scheduling plans are provided to comparison engine 1441, which defines a tuned scheduling plan.

This tuned scheduling plan is provided to prediction engine 1482, which applies one or more traffic tuning parameters that are higher in priority than a traffic tuning parameter related to tuning engine 1010. In this example, prediction engine 1482 applies an arrangement of traffic tuning parameters that differs from an arrangement of traffic tuning parameters applied by prediction engine 1481. The resulting tuned scheduling plans are provided to comparison engine 1342, which defines a tuned scheduling plan for tuning engine 1010 that preserves tuning for the traffic tuning parameter related to tuning engine 1010 that will not be reversed or removed during later tuning by other tuning engines related to the one or more traffic tuning parameters that are higher in priority than a traffic tuning parameter related to tuning engine 1010.

Figure 15:
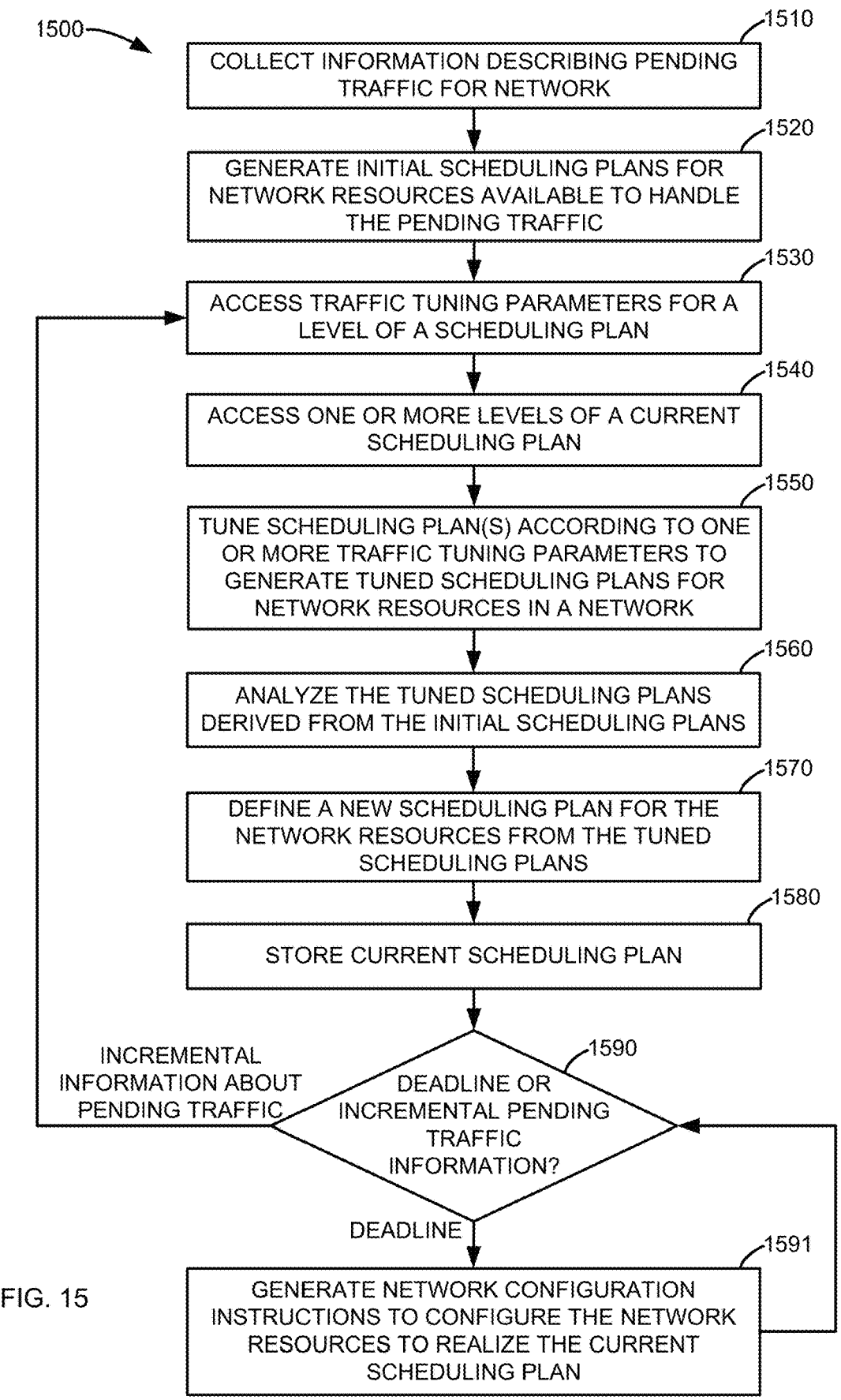
FIG. 15 is a flowchart of a network scheduling process, according to an implementation.

FIG. 15 is a flowchart of a network scheduling process, according to an implementation. Similar to processes 300 and 700 discussed above in relation to FIGS. 3 and 5, respectively, process 1500 can be implemented at a traffic scheduling system implemented as logic circuitry, instructions execute at one or more processors, or a combination thereof. Additionally, references to process 1500 performing a function should be understood to refer to a traffic scheduling system implementing process 1500.

Information describing pending traffic for a network is collected at block 1510. For example, as discussed in relation to other implementations, information about pending traffic for a network can be collected at or from SDN applications, network applications, or from network traffic profiling techniques. Initial scheduling plans are then generated from that information and a description of network resources within the network that are available to handle the pending traffic at block 1520.

Traffic tuning parameters for a level of a scheduling plan associated with a component of a traffic scheduling system such as a tuning engine or option engine are accessed at block 1530. For example, the traffic tuning parameters can be accessed at a policy for that level of a scheduling plan. At block 1540, if a current scheduling plan has been previously defined, that current scheduling plan or the level of the current scheduling plan for which traffic tuning parameters are accessed at block 1540 is accessed. The initial scheduling plans or a current scheduling plan or level thereof if previously defined are then tuned according to the traffic tuning parameters accessed at block 1530 to generate tuned scheduling plans for the network resources available to handle the pending traffic in the network at block 1550. If a level of the current scheduling plan, rather than the entire current scheduling plan, is accessed at block 1540, only that level of the current scheduling plan, again rather than the entire current scheduling plan, can be tuned. Such implementations can be applicable to incrementally tuning scheduling plans as discussed in other example herein.

The tuned scheduling plans, or tuned level or levels of scheduling plans, are then analyzed at block 1560 and a new scheduling plan or new level of a scheduling plan for the network resources is defined from the tuned scheduling plans at block 1570. The new scheduling plan or new level of a scheduling plan is then stored as a current scheduling plan or level of a current scheduling plan at block 1580. If a current scheduling plan (or level thereof) was previously defined, that current scheduling plan (or level thereof) can be updated at block 1580 with the new scheduling plan or new level of a scheduling plan defined at block 1570.

At block 1590, process 1500 determines whether a deadline has occurred or incremental information about pending traffic is received. If the deadline has not occurred and incremental information about pending traffic has not been received, process 1500 remains at block 1590.

The deadline can be a deadline associated with an amount of time required to determine and/or deploy a current scheduling plan. In some implementations, the deadline is a cut-off time at which changes can no longer be made to network configuration instructions before they must be provided to network resources to ensure that the network devices are available and ready to handle pending traffic. As a specific example, the deadline is based on one or more of three times. First, a tuning time TT is the time required to translate information about pending traffic (e.g., incremental information about pending traffic) into tuned scheduling plan. Second, a combining time CT is the time to analyze tuned scheduling plans and define a current scheduling plan (e.g., a single scheduling plan for the network at a given time). Third, a deploy time DT is the time to generate network configuration instructions from the current scheduling play and to provide these network configuration instructions to the network infrastructure (e.g., network resources of the network) in time for the pending traffic. Accordingly, no additional information about pending traffic can be accepted less that TT+CT+DT units of time before the pending traffic is expected to enter the network.

The values of TT, CT, and DT can vary based on the amount of information about pending traffic. That is, incremental information about smaller changes in pending traffic (e.g., pending traffic that affects a small portion of the network) can have shorter TT, CT, and DT times that changes in pending traffic that affect large portions of the network or the entire network. Accordingly, by performing incremental updates to stored current scheduling plans as discussed above and in additional detail below, such updates can have shorter TT+CT+DT times and be entered into the system later (with less warning) than changes to the pending traffic for the entire network that incur long TT+CT+DT times.

If the deadline has occurred, for example, if a current time is not more than TT+CT+DT before pending traffic will be introduced into the network, process 1500 determines the current scheduling plan is a final scheduling plan (i.e., a scheduling plan that should be used to generate network configuration instructions) and proceeds to block 1591 to generate network configuration instructions to configure network resources to realize the current scheduling plan. For example, the current scheduling plan can be output to a deployment engine to generate network configuration instructions to configure network resources to realize the current scheduling plan. Additionally, although not illustrated in FIG. 15, process 1500 can provide the network configuration instructions to network resources (or deploy the network configuration instructions) to realize the current scheduling plan in the network. For example, Openflow® commands can be provided to the network resources via an SDN controller and control plane of a network.

If incremental information about pending traffic is received at block 1590, process 1500 proceeds to block 1530 to incrementally tune scheduling plans based on the incremental information about pending traffic and a current scheduling plan at blocks 1530-1580. Incremental information about pending traffic is information about pending traffic for the network that describes network requirements and is related to only a portion of the network and/or is an update or modification of previously provided information about pending traffic. Scheduling plans can be incrementally tuned based on incremental information about pending traffic and a current scheduling plan by tuning scheduling plans or portions thereof that are affected by the incremental information about pending traffic.

For example, one or more scheduling plans representing the incremental information about pending traffic can be incrementally generated from the incremental information. These scheduling plans can be tuned as discussed herein to generate a tuned scheduling plan at block 1550. As an example, potential scheduling plans can be incrementally generated from the incremental information and one or more tuned scheduling plans incrementally defined from the potential scheduling plans. That is, in some implementations, potential scheduling plans can be incrementally generated and tuned scheduling plans incrementally defined by operating on the levels (or portions) of those scheduling plans and a current scheduling plan that are affected or modified by the incremental information. In some implementations, levels of those scheduling plans and/or a current scheduling plan that are not affected or modified by the incremental information may be accessed, but are not modified.

A scheduling plan can be incrementally defined level by level using a data structure stored at a memory such as data structure 1600 illustrated and discussed in relation to FIGS. 16 and 18A-18E. For example, each tuning engine of a tuning system can be associated with a particular scheduling plan level, and can generate new information for only that level. Each tuning engine generates information for a particular level of the scheduling plan, and updates the portion of a data structure stored at a memory that represents the scheduling plan corresponding to that level.

Accordingly, in response to receiving incremental information about pending traffic that is related to one level, the current scheduling plan can be incrementally tuned only at that level as discussed in relation to FIG. 15 and other examples herein. In other words, a tuning engine or group of tuning engines can tune that level of the current scheduling plan and not other levels of the current scheduling plan.

Accordingly, updates to a current scheduling plan can be limited or localized to the scheduling plan level with which a tuning engine is associated. This process can be repeated for various levels of the current scheduling plan in response to receipt of incremental information about pending traffic associated with those levels. Thus, different levels of a current scheduling plan can be updated incrementally based on incremental information about pending traffic associated with the various levels of the current scheduling plan.

The tuned scheduling plan (or plans) can be analyzed together with the current scheduling plan and then be analyzed at block 1560. A portion of the current scheduling plan that relates to the portion of the network or pending traffic for the network can then be modified with the tuned scheduling plan or a combination thereof at block 1570 to incrementally define a new current scheduling plan. This scheduling plan can be stored for later use in incrementally modifying the current scheduling plan at block 1580.

Such incrementally generating scheduling plans modifying a current scheduling plan can be applied to examples discussed above. For example, current scheduling plans can be stored at the traffic scheduling system discussed in relation to FIG. 4 and used to incrementally modify the current scheduling plan. Additionally, current scheduling plans can be stored at the traffic scheduling systems (or tuning engines) illustrated in FIGS. 8-14. Specifically, for example, current scheduling plans defined by comparison engines can be provided to option engines for incrementally generating potential scheduling plans from incremental information about pending traffic for a network.

Figures 16, 17:
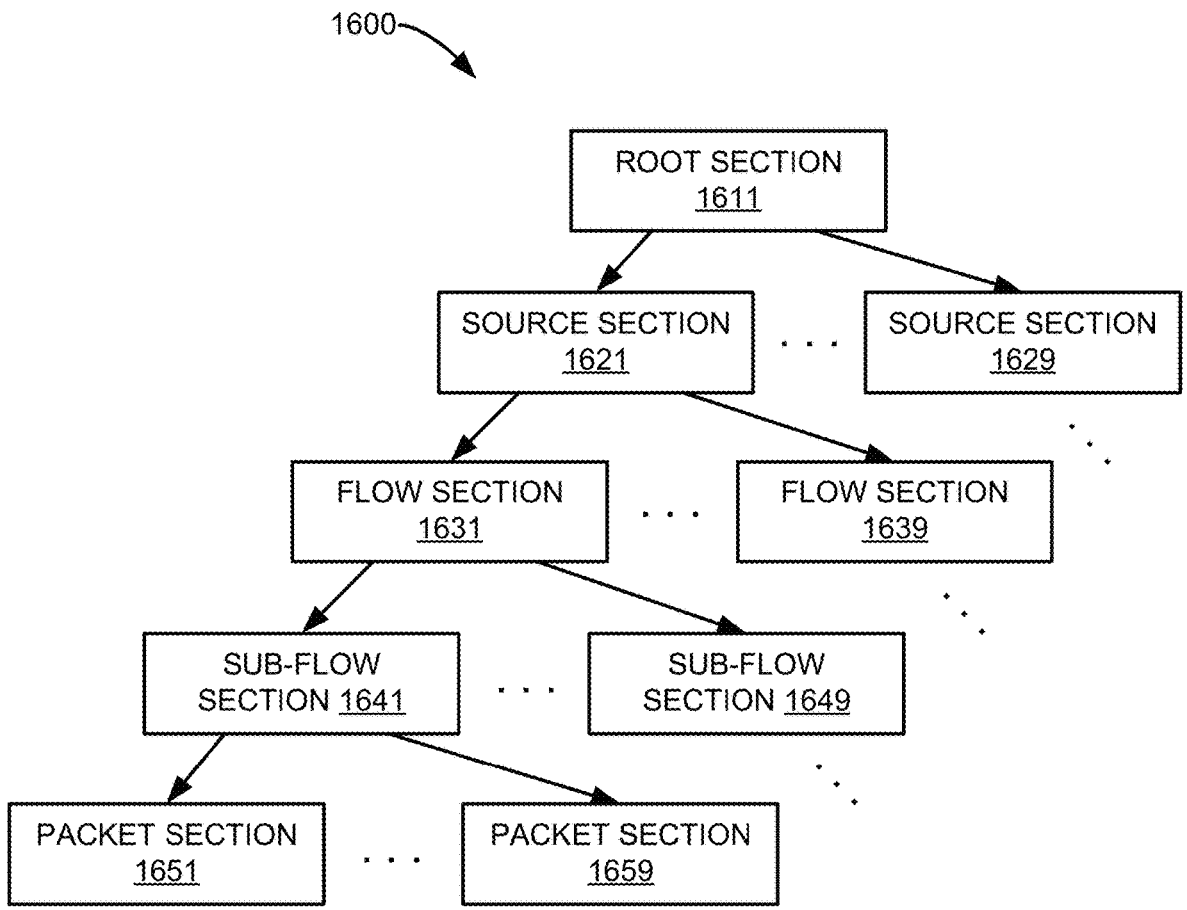
FIG. 16 is an illustration of a data structure representing a scheduling plan, according to an implementation.
FIG. 17 is an illustration of a data structure representing a rule, according to an implementation.

FIG. 16 is an illustration of a data structure representing a scheduling plan, according to an implementation. Data structure 1600 discussed in relation to FIGS. 16 and 18A-18E can be stored at a non-transitory memory of a traffic scheduling system, and can be useful to organize scheduling plans for incremental modification. Additionally, data structure 1600 can itself be referred to as a scheduling plan.

Root section 1611 stores information about all known pending traffic in a network, and references source sections 1621-1629. Each source section of data structure 1600 represents pending traffic for a particular source within a network such as a computing device operatively coupled to the network. In other words, source sections of data structure 1600 describe pending traffic for a source in the network. Source section 1621 references flow sections 1631-1639. Source sections 1622-1629 reference other flow sections (not shown for clarity in FIG. 16).

Flow sections of data structure 1600 represent flows or connections within the network from a source to a destination, and reference sub-flow sections of data structure 1600. As illustrated in this example, flow section 1631 references sub-flow sections 1641-1649. Flow sections 1632-1699 reference other sub-flow sections (not shown for clarity in FIG. 16). Sub-flow sections of data structure 1600 represent portions of flows or connections represented by flow sections 1631-1639 that share one or more temporal relationships. For example, a sub-flow section can represent groups of data packets that span a particular time period.

Sub-flow sections of data structure 1600 reference packet sections, which represents data packets via which data are communicated through the network. As illustrated in the example of FIG. 16, sub-flow section 1641 references packet sections 1651-1659. Sub-flow sections 1642-1649 reference other packet sections (not shown for clarity in FIG. 16). Additional details of each section of data structure 1600 are discussed below in relation to FIGS. 18A-18E.

As illustrated in FIG. 16, root section 1611 references (or points) to lower lever source sections that describe lower level details of a scheduling plan. Similarly, source sections reference lower level flow sections that describe lower level details of a scheduling plan. Flow sections reference lower level sub-flow sections that describe lower level details of a scheduling plan. Sub-flow sections reference lower level packet sections that describe lower level details of a scheduling plan. Thus, sections rely on lower level sections for lower level or more detailed information.

The hierarchical structure of data structure 1600 facilitates incrementally modifying scheduling plans because incremental information about pending traffic can be added to the section of data structure 1600 that is related to that pending traffic, and only the sections above that section need to be tuned and updated to modify the scheduling plan. This incremental information about pending traffic can be efficiently added to and operated on within data structure 1600 to reduce the TT, CT, and DT times discussed above. That is, modifying a scheduling plan represented by data structure 1600 can be efficiently modified because data structure 1600 does not rely on a full or complete update when one part is updated. Rather, modifications such as incremental updates to various sections of data structure 1600 can be made without affecting other sections of data structure 1600.

FIG. 17 is an illustration of a data structure representing a rule, according to an implementation. Similar to data structure 1600, data structure 1700 can be stored at a non-transitory processor readable medium such as a memory of a traffic scheduling system, and is used to facilitate generation and modification of scheduling plans. The DECISION ID. (or identifier) field of each rule (e.g., instance of data structure 1700 within a memory) is assigned a identifier, which is stored at this field. The value in the Decision ID. field can be used to identify a particular rule.

The next field is a labeled REQ. USED LIST and includes references (e.g., pointers) to requirements of a scheduling plan represented by a data structure that were used to tune, define, or generate an associated scheduling plan. The value or values in the REQ. USED LIST field can reference low level network requirements of pending traffic or to higher level requirements of pending traffic at various sections of a scheduling plan stored at data structure 1600.

The next field of data structure 1700 (or a rule represented by data structure 1700) is labeled OPTNS. EXCLD. LIST and includes references to scheduling plans that were provided as input to generate or define the scheduling plan associated with this rule. This allows components of a traffic scheduling system to identify the scheduling plans that were accessed to define a new or modified scheduling plan.

The CHANGES LIST field contains a description of changes made to generate or define a scheduling plan. For example, the CHANGES LIST field can include descriptions of changes such as rearranging packets, rearranging flows or sub-flows, changing references to timing information, or other changes.

The TRAFFIC PLAN ENTRY field includes a pointer to the description, path, and timing sections of the packet sections of a scheduling plan represented by data structure 1600 that is associated with this rules data structure. The STATUS field includes the status of the component of a traffic scheduling system that uses these data structures.

Figure 18A:
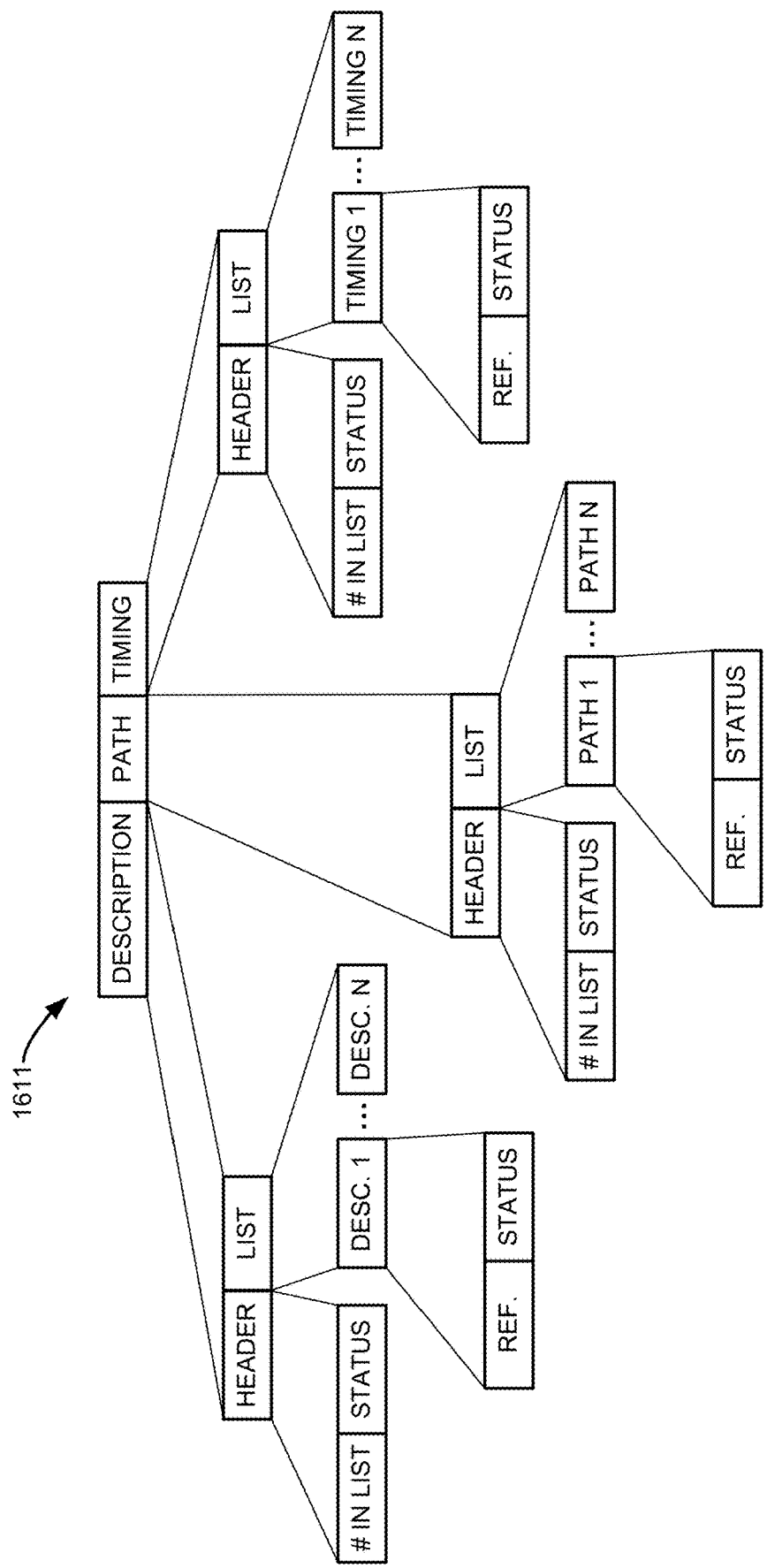
FIGS. 18A-18E are illustrations of the data structure representing the scheduling plan shown in FIG. 16, according to an implementation.

FIGS. 18A-18E are illustrations of the data structure representing the scheduling plan shown in FIG. 16, according to an implementation. FIG. 18A illustrates root section 1611 of data structure 1600. Root section 1611 includes a description field, a path field, and a timing field, each of which include multiple sub-fields. The description field includes a header and a list of descriptions (DESC.) of traffic sources (e.g., a computing system that transmits data via a network). The header includes status information and the number of traffic sources in the list. Each description of a traffic source includes a status (STATUS) of that traffic source and a reference (or pointer, REF.) to a description field of a source section.

The path field includes a header and a list of path descriptions (PATH) for sources represented by source sections. The header includes status information and the number of path descriptions in the list. Each path description includes a status (STATUS) of the path(s) for a traffic source and a reference (REF.) to a path field of a source section.

The timing field includes a header and a list of timing descriptions (TIMING) for traffic sources represented by source sections. The header includes a field that indicates the number of timing descriptions for the packet sources that comprise the overall plan and the summary status of the timing for this traffic source. The list of timing descriptions includes a timing description for each traffic sources in a scheduling plan. Each timing description includes a reference to the traffic source timing details at a timing field of a source section and the status of the timing for this traffic source.

Figure 18B:
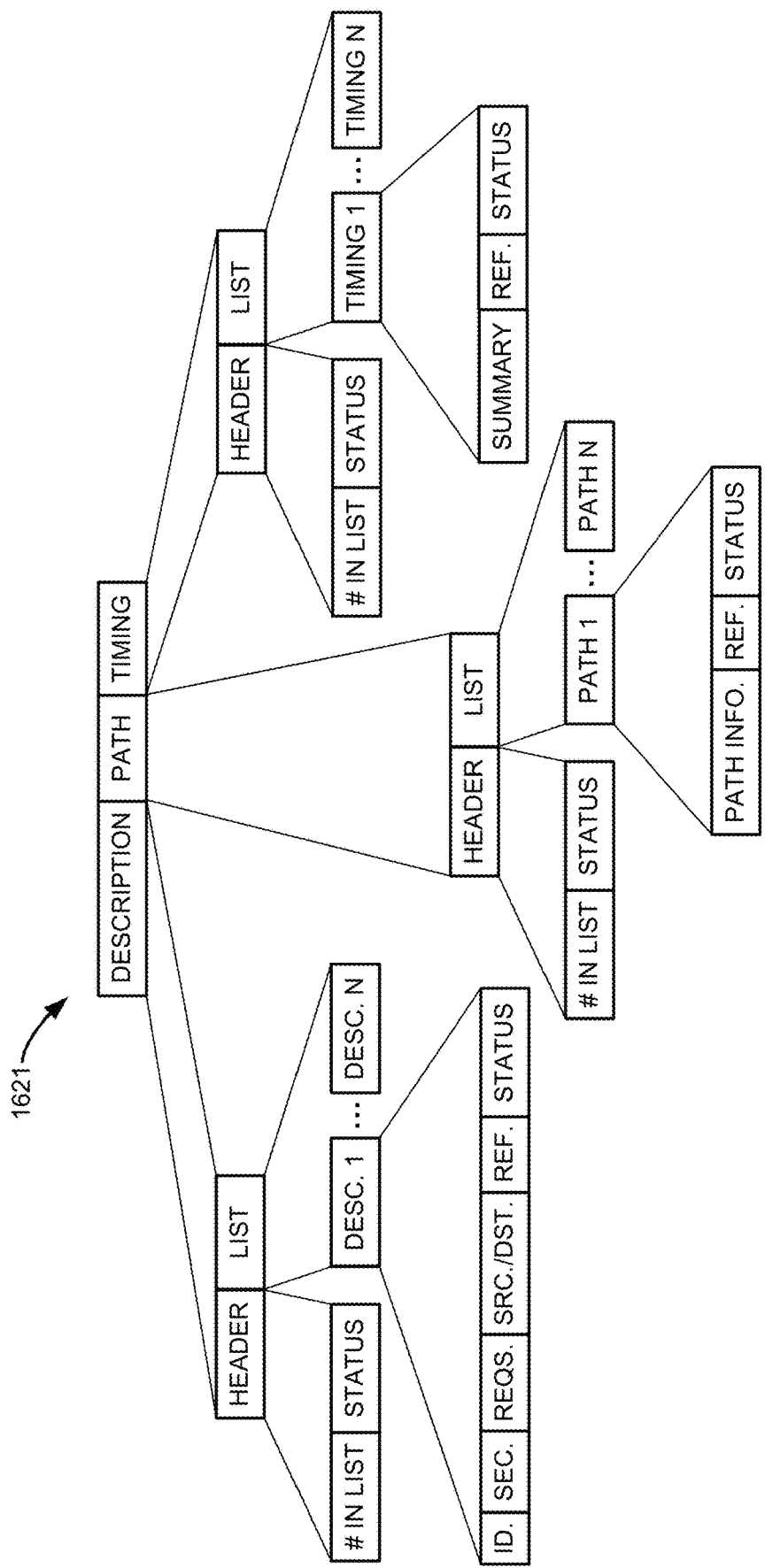

FIG. 18B illustrates source section 1621 of data structure 1600. Source section 1621 includes a description field, a path field, and a timing field, each of which include multiple sub-fields. Similar to root section 1611, each of the description field, the path field, and the timing field include a header with a number of items in a list and status information.

For source section 1621, the descriptions (DESC.) are for each flow (e.g., a stream of data packets) that is expected from this traffic source (i.e., the traffic source associated with source section 1621). The description contains information including a traffic identifier (ID.) assigned to this traffic source, an authorized traffic owner of the traffic identifier (SEC.), the network requirements (REQS.) such as timing requirements that the related flow should meet, the source and the destination of the traffic source (SRC./DST.), a reference (REF.) to the flow details in flow sections, and the status (STATUS) of this flow.

The path information (PATH) includes an identifier of a portion of a network such as a network slice identifier that this flow should use and includes the source associated with source section 1621 (PATH INFO.). The path information also includes a reference (REF.) to a flow section path description and a status (STATUS). The timing information (TIMING) contains a summary (SUMMARY) of all the timing information from the lower sections in data structure 1600, a reference (REF.) to a timing description of a flow section, and status (STATUS) of the timing for this flow.

Figure 18C:
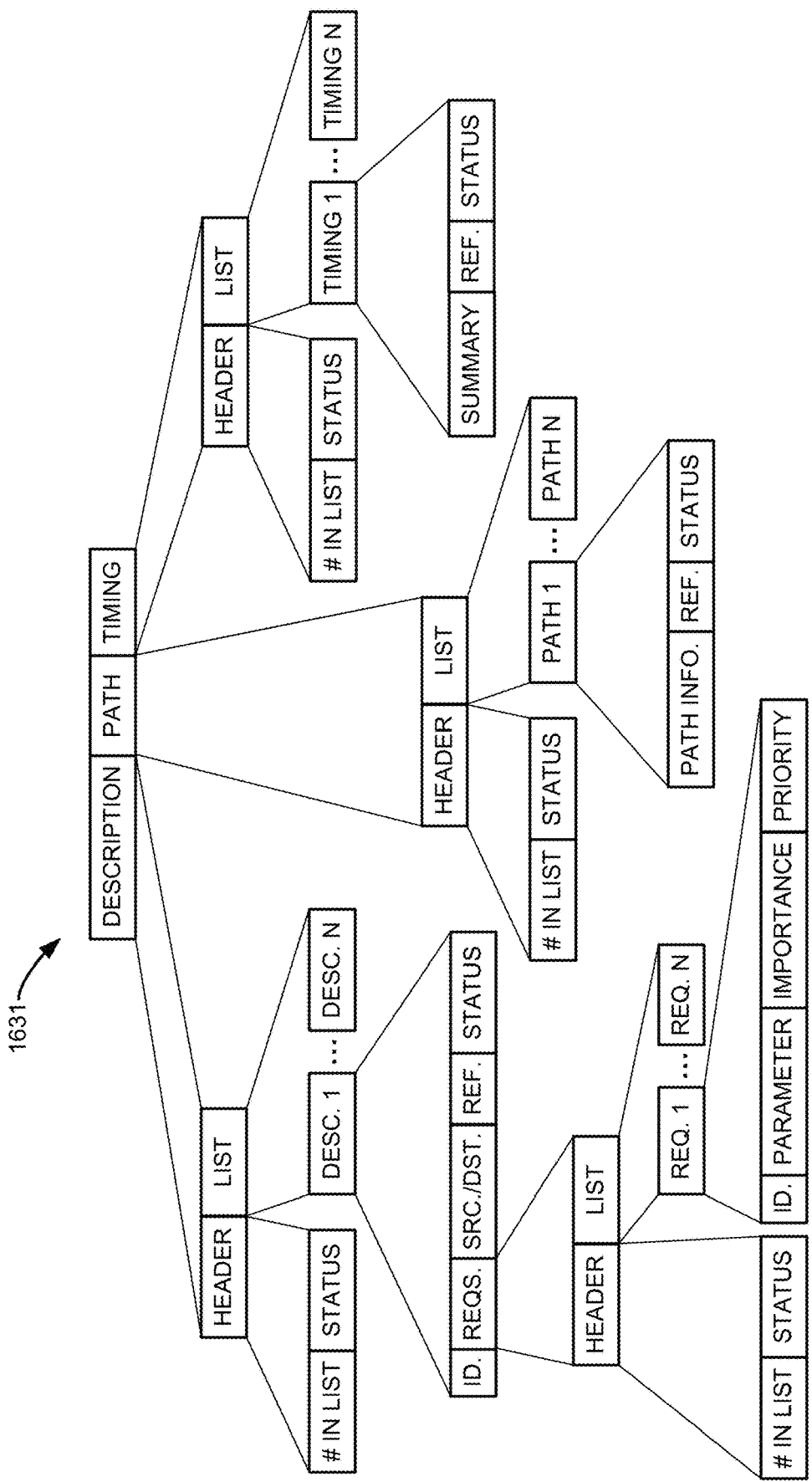

FIG. 18C illustrates flow section 1631 of data structure 1600. Flow section 1631 includes a description field, a path field, and a timing field, each of which include multiple sub-fields. Similar to root section 1611, each of the description field, the path field, and the timing field include a header with a number of items in a list and status information. For flow section 1631, the descriptions (DESC.) are for each sub-flow (e.g., a portion of a stream of data packets) that is expected from this flow (i.e., the flow associated with flow section 1631).

The description contains information including a traffic identifier (ID.) assigned to this traffic source, the network requirements (REQS.) such as timing requirements that the related sub-flow should meet, the source and the destination of the flow (SRC./DST.), a reference (REF.) to the flow details in sub-flow sections, and the status (STATUS) of this sub-flow.

As illustrated in FIG. 18C, the network requirements can include a header field with a number of requirements (REQ.) in a list and a status. Each requirement in the list of requirements describes a network requirement for the related sub-flow and can include information about what the traffic requires. For example, each requirement includes an identifier (ID.); a traffic tuning parameter (PARAMETER) such as energy conservation, quality of service, latency, reliability, or another parameter, an importance indicator for the requirement (IMPORTANCE), and a priority of the requirement (PRIORITY). Similar requirements can be used at other sections of data structure 1600.

The path information (PATH) includes an identifier of a portion of a network such as a network slice identifier that the related sub-flow should use (PATH INFO.). The path information also includes a reference (REF.) to a sub-flow section path description and a status (STATUS). The timing information (TIMING) contains a summary (SUMMARY) of all the timing information from the lower sections in data structure 1600, a reference (REF.) to a timing description of a sub-flow section, and status (STATUS) of the timing for this sub-flow.

Figure 18D:
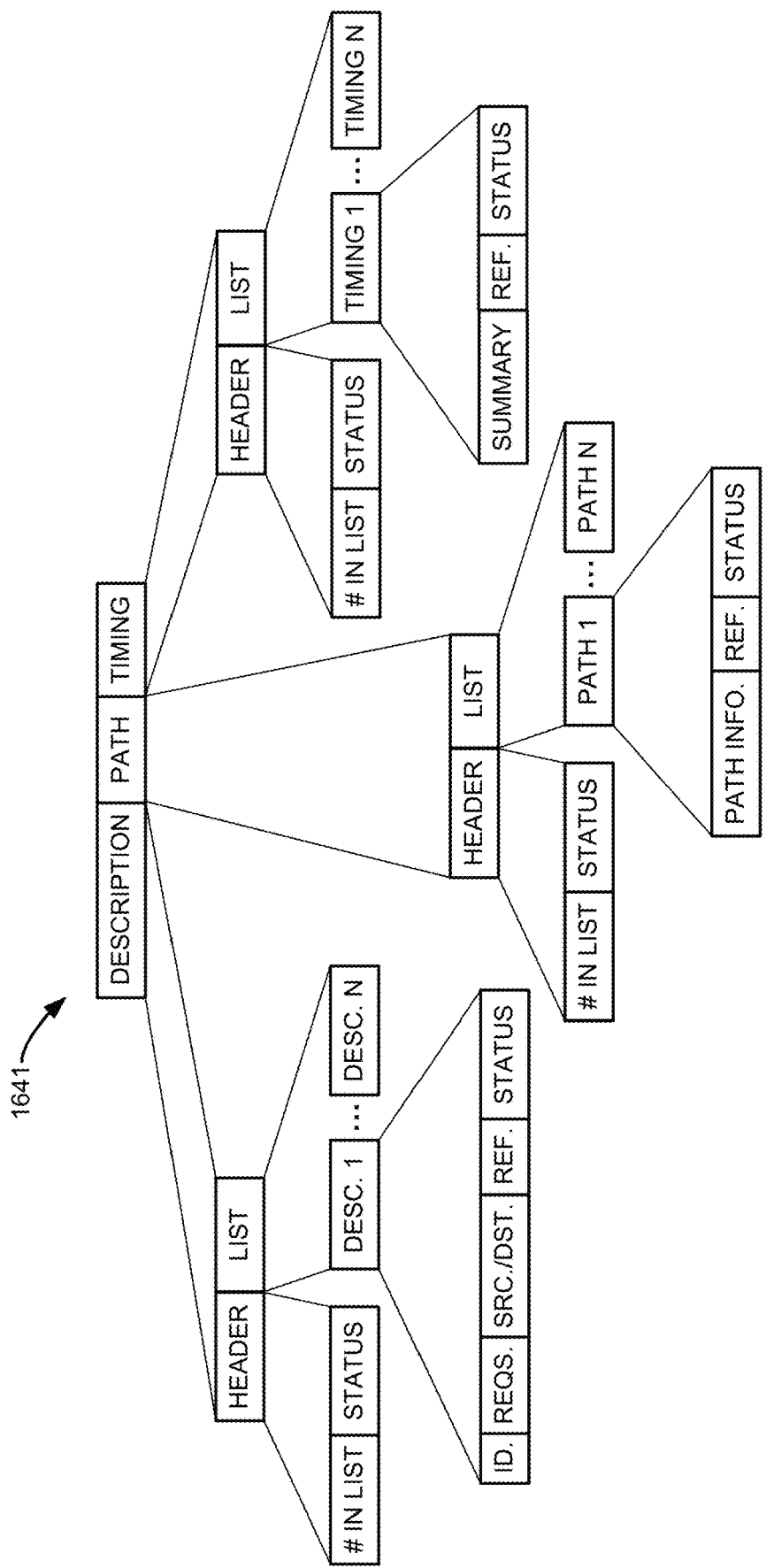

FIG. 18D illustrates sub-flow section 1641 of data structure 1600. Sub-flow section 1641 includes a description field, a path field, and a timing field, each of which include multiple sub-fields. Similar to root section 1611, each of the description field, the path field, and the timing field include a header with a number of items in a list and status information. For sub-flow section 1641, the descriptions (DESC.) are for each packet that is expected from this sub-flow (i.e., the sub-flow associated with flow section 1641).

The description contains information including a traffic identifier (ID.) assigned to this traffic source, the network requirements (REQS.) such as timing requirements that the related packet should meet, the source and the destination of the packet (SRC./DST.), a reference (REF.) to the sub-flow details in packet sections, and the status (STATUS) of this packet.

The path information (PATH) includes an identifier of a portion of a network such as a network slice identifier that the related packet should use (PATH INFO.). The path information also includes a reference (REF.) to a packet section path description and a status (STATUS). The timing information (TIMING) contains a summary (SUMMARY) of all the timing information from the lower sections in data structure 1600, a reference (REF.) to a timing description of a packet section, and status (STATUS) of the timing for this packet.

Figure 18E:
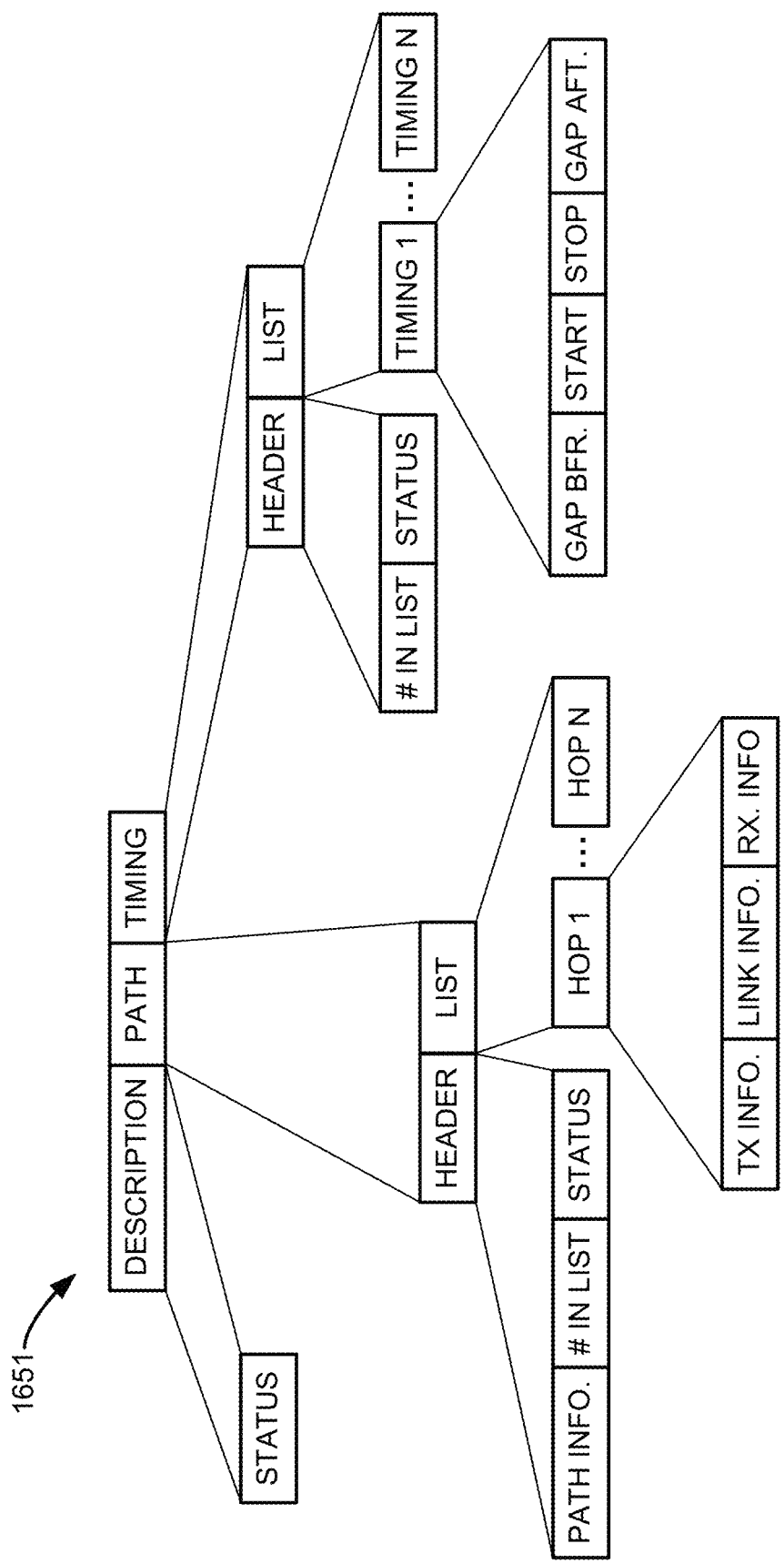

FIG. 18E illustrates packet section 1651 of data structure 1600. Packet section 1651 includes a description field, a path field, and a timing field, each of which include multiple sub-fields. Packet section 1651 describes a set individual packets bound by a time frame to aid tuning by limiting the range of time frame options for the traffic covered by this scheduling plan. The description field (DESCRIPTION) includes a status of the related packet. Similar to root section 1611, each of the path field and the timing field include a header with a number of items in a list and status information. The header of the path field also includes information about a path (PATH INFO.) of a packet related to packet section 1651.

The path field includes a list of hops (HOP) across the network. Each hop includes information about associated transmit, link, and received network resources (TX INFO., LINK INFO., and RX INFO., respectively) that need to be provisioned or configured for each hop for this packet. The timing information (TIMING) provides a time to start transition (START), when receive should be completed (STOP), the gap between the preceding packet (GAP BFR.), and the gap until the next packet (GAP AFT.). Typically, GAP AFT. of hop n should be the same a GAP BFR. of hop n+1.

The values stored at these fields can be set, updated, and accessed by traffic scheduling systems and methods to tune a scheduling plan represented by data structure 1600. For example, requirements discussed above can be accessed to determine appropriate or allowable values for TX INFO., LINK INFO., and RX INFO. fields for each HOP field. These values can then be used to generate network configuration instructions.

Figure 19:
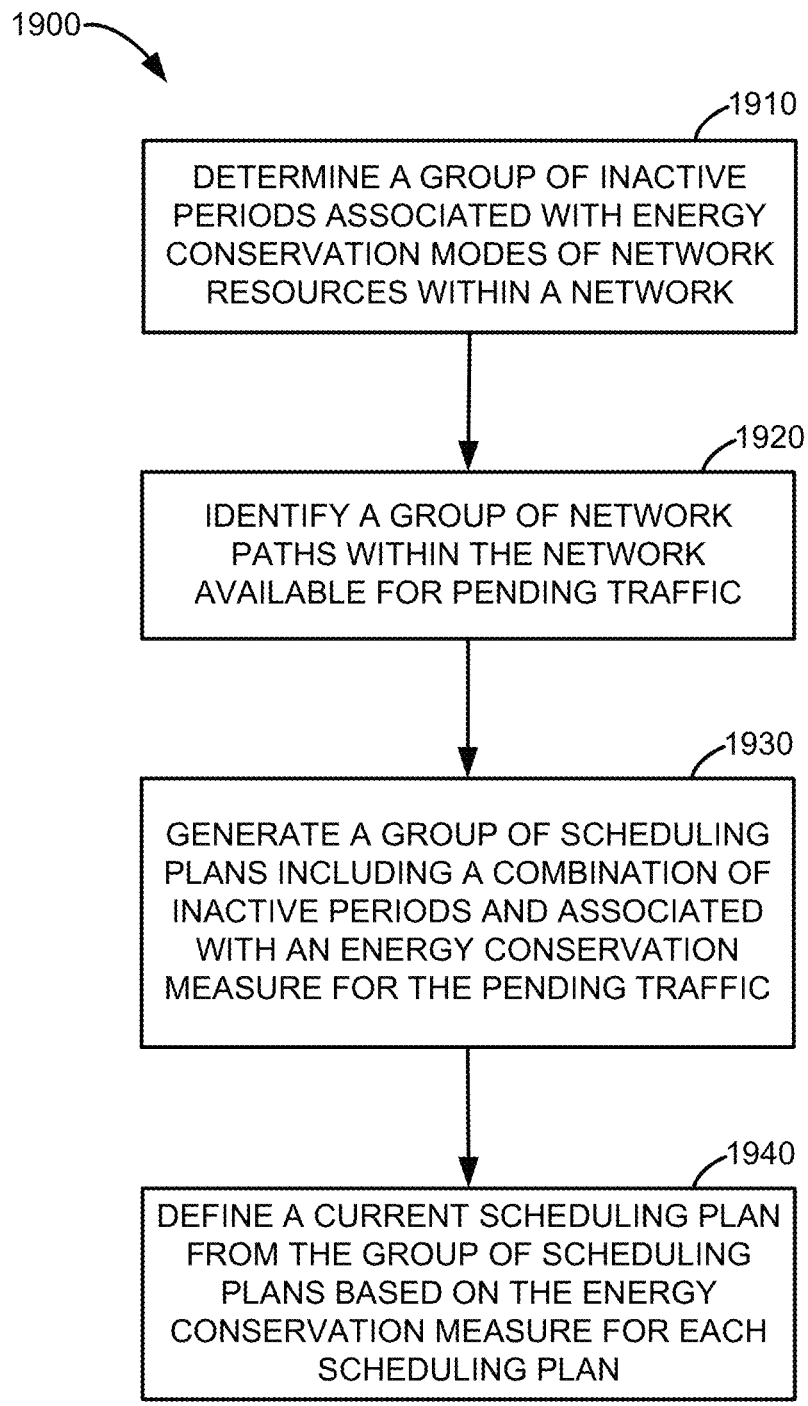
FIG. 19 is a flowchart of a network energy conservation process, according to an implementation.

FIG. 19 is a flowchart of a network energy conservation process, according to an implementation. Similar to process 1500 discussed above in relation to FIG. 15, process 1900 can be implemented at a traffic scheduling system implemented as logic circuitry, instructions execute at one or more processors, or a combination thereof. Additionally, references to process 1900 performing a function should be understood to refer to a traffic scheduling system implementing process 1900.

A group of inactive periods associated with energy conservation modes of network resources within a network are determined at block 1910. For example, process 1900 can access a database to determine energy conservation modes of network resources within a network. As discussed above in relation to FIGS. 1 and 2, network resource can include a variety of energy conservation modes that are associated with periods of inactivity. That is, the energy conservation modes into which network resources can be configured can depend on the amount of time those network resource can be idle or inactive. Such inactive periods are identified at block 1910.

A group of network paths within a network that are available for pending traffic are then identified at block 1920. For example, process 1900 can communicate with an SDN controller or another entity to identify network paths through a network that satisfy network requirements of the pending traffic.

At block 1930, a group of scheduling plans that include various combinations of inactive periods and are each associated with an energy conservation measure are generated for the pending traffic. For example, a group of potential scheduling plans can be generated at an option engine by varying gap times discussed above in relation to FIG. 18E within the limits of one or more requirements of the pending traffic for network resources.

Each potential scheduling plan is associated with an energy conservation measure that can be calculated or determined from the energy conservation modes available to each network device used in the potential scheduling plans. That is, the energy conservation measure associated with each potential scheduling plan is equal to the sum of the energy conservation measure for the conservation modes available to each network device used in the potential scheduling plans in view of the inactive periods in that potential scheduling plan. The inactive periods are periods of time during which network resources can expect to not handle network traffic according to a potential scheduling plan.

The energy conservation measure of each potential scheduling plan can be used to define a current scheduling plan for the pending traffic at block 1940. For example, the energy conservation measure of each potential scheduling plan can be the metric for evaluating which potential scheduling plan is optimal or preferred. Accordingly, the potential scheduling plan that provides the most significant energy conservation measure can be selected as the current scheduling plan. In other implementations, multiple potential scheduling plans can be combined to define a current scheduling plan that has a higher energy conservation measure than the energy conservation measures associated with the potential scheduling plan.

In other implementations, energy conservation measures can be associated with tuned scheduling plans. That is, the current scheduling plan can be defined from tuned scheduling plans generated from, for example, potential scheduling plans or initial scheduling plans as discussed in other implementations that each have an associated energy conservation measure.

FIGS. 20A-20E are an illustration of a network scheduling process, according to an implementation. More specifically, FIGS. 20A-20E illustrates rule data structure 2011 during a tuning process. Each field of rule data structure 2011 is labeled. FIGS. 20A-20E illustrate updates to rule data structure 2011 in an example of a two-priority traffic scheduling system.

In FIG. 20A, initial scheduling plan 2021 (illustrated graphically) has packets A, B, and C with gaps (inactive periods) between X and Y, which are in a packet section of initial scheduling plan 2021. Gap Z is precedes a subsequent packet train. Rules data structure 2011 has the field definitions directly above each field. The DECISION ID. is assigned a value of n. The REQS. USED LIST field contains references (or pointers) to traffic plan requirements fields that were used to create initial scheduling plan 2021. The references can be to lower level requirements or to higher sections when a scheduling plan is tuned. Because initial scheduling plan 2021 is the initial scheduling plan, the pointer points to the highest level in the packet section for packets A, B, and C.

The OPTNS. EXCLD. LIST includes references to traffic plans that were received as inputs to generate initial scheduling plan 2021. Because initial scheduling plan 2021 is the initial plan, the reference is NULL. The CHANGES LIST contains a list of changes made from the input to the output. Because initial scheduling plan 2021 is the initial scheduling plan, the reference is NULL.

The TRAFFIC PLAN ENTRY field contains a reference to the DESCRIPTION, PLAN, and TIMING fields of the packet section of initial scheduling plan 2021 that is associated with rules data structure 2011. The STATUS field includes the status of the tuning process that uses these data structures. Because initial scheduling plan 2021 is the initial scheduling plan, the status is INIT.

In this two-priority example, the power tuning changes initial scheduling plan 2021 in FIG. 20B to generate scheduling plan 2022 that puts packets A, B, and C and gaps X, Y, and Z together. Rules data structure 2011 is updated to include references to the power requirements in scheduling plan 2022 (REQS. USED LIST), include references to the changes in packet timing information in rules data structure 2011 (CHANGES LIST), and have the status of tuning (STATUS). Additionally, a reference to initial scheduling plan 2021 is added (OPTNS. EXCLD. LIST) because initial scheduling plan 2021 was an input to the tuning in FIG. 20B. Also, TRAFFIC PLAN ENTRY includes a reference to the packet section of scheduling plan 2022.

In FIG. 20C, the QoS (Quality of Service) tuning changes scheduling plan 2022 to generate scheduling plan 2023, in which high priority packet A is first and low priority packet C last. Rules data structure 2011 is updated to include references to the QoS requirements in scheduling plan 2023 (REQS. USED LIST), include references to the changes in packet order information in rule data structure 2011 (CHANGES LIST), and have the status of tuning (STATUS). Additionally, a reference to scheduling plan 2022 is added (OPTNS. EXCLD. LIST) because scheduling plan 2022 was an input to the tuning in FIG. 20C. Also, TRAFFIC PLAN ENTRY includes a reference to the packet section of scheduling plan 2023.

Next, FIG. 20D, the power tuning analyzes scheduling plan 2023 and puts packets A, B, and C first and gaps X, Y, and Z last to increase an inactive period for one or more network resources. Rules data structure 2011 is updated to include references to the QoS and power requirements in scheduling plan 2024 (REQS. USED LIST), include references to the changes in packet timing information in rule data structure 2011 (CHANGES LIST), and have the status of tuning (STATUS). Additionally, a reference to scheduling plan 2023 is added (OPTNS. EXCLD. LIST) because scheduling plan 2023 was an input to the tuning in FIG. 20D. Also, TRAFFIC PLAN ENTRY includes a reference to the packet section of scheduling plan 2024.

In FIG. 20E, the QoS tuning takes scheduling plan 2024 as input and does not need to make any changes outputs scheduling plan 2025. Because no changes were made both the OPTNS. EXCLD. LIST and CHANGES LIST fields are NULL and the status is now tuned (STATUS). Also, TRAFFIC PLAN ENTRY includes a reference to the packet section of scheduling plan 2025 and REQS. USED LIST includes references to the QoS and power requirements in scheduling plan 2025.

As used herein, the term "engine" refers to a combination of hardware (e.g., a processor such as an integrated circuit or other circuitry) and software (e.g., programming such as machine- or processor-executable instructions, commands, or code such as firmware, programming, or object code). A combination of hardware and software includes hardware only (i.e., a hardware element with no software elements such as an ASIC), software hosted at hardware (e.g., a software module that is stored at a processor-readable memory such as RAM, a hard-disk or solid-state drive, resistive memory, or optical media such as a DVD and/or executed or interpreted at a processor), or hardware and software hosted at hardware.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As an example, functionalities discussed above in relation to specific modules or elements can be included at different modules, engines, or components in other implementations. As a more specific example, examples of engines discussed herein as implemented as modules stored at a non-transitory memory and/or hosted at a processor can be implemented as circuitry or logic in hardware. Furthermore, it should be understood that the systems, apparatus, and methods described herein can include various combinations and/or sub-combinations of the components and/or features of the different implementations described. Thus, features described with reference to one or more implementations can be combined with other implementations described herein.

As used herein, the singular forms "a," "an," and "the" include plural referents unless the context clearly dictates otherwise. Thus, for example, the term "engine" is intended to mean one or more modules or a combination of engine. Furthermore, as used herein, the term "based on" means "based at least in part on." Thus, a feature that is described as based on some cause, can be based only on the cause, or based on that cause and on one or more other causes. Similarly, as used herein, the term "using" means "using at least". Accordingly, for example, an operation described as using some operand, can use only that operand or use that operand and one or more additional operands.

What is claimed is:

1. A network scheduling method, comprising:
   collecting information describing pending traffic for a network;
   generating a plurality of initial scheduling plans for network resources associated with the pending traffic within the network, wherein the plurality of initial scheduling plans are for a single state of pending traffic;
   deriving a plurality of tuned scheduling plans from the plurality of initial scheduling plans, wherein deriving a respective tuned scheduling plan involves determining a plurality of inactive periods associated with energy conservation modes of a plurality of the network resources, and wherein the respective tuned scheduling plan includes a combination of inactive periods and is associated with an energy conservation measure;
   analyzing the plurality of tuned scheduling plans, wherein analyzing the plurality of tuned scheduling plans comprises determining a prioritized network scheduling objective and identifying one or more tuned scheduling plans that satisfy the prioritized network scheduling objective; and
   defining a current scheduling plan for the network resources based on the one or more identified tuned scheduling plans and the energy conservation measure associated with each tuned scheduling plan.

2. The method of claim 1, further comprising:
   receiving information describing the pending traffic in the network from a plurality of network applications via a control plane of the network.

3. The method of claim 1,
   wherein obtaining the plurality of tuned scheduling plans comprises tuning the initial scheduling plans according to one or more traffic tuning parameters.

4. The method of claim 1, further comprising:
   generating a plurality of network configuration instructions to configure the network resources to realize the current scheduling plan; and
   providing the plurality of network configuration instructions to the network resources via a control plane of the network.

5. A network scheduling system, comprising:
   an aggregation engine to provide a plurality of initial scheduling plans for network resources associated with pending traffic within a network, wherein the plurality of initial scheduling plans are for a single state of pending traffic;
   a tuning system to tune the initial scheduling plans to generate a plurality of tuned scheduling plans for the network resources, wherein generating a respective tuned scheduling plan involves determining a plurality of inactive periods associated with energy conservation modes of a plurality of the network resources, and wherein the respective tuned scheduling plan includes a combination of inactive periods and is associated with an energy conservation measure; and an analysis engine to analyze the plurality of tuned scheduling plans and to define a current scheduling plan from the plurality of tuned scheduling plans, wherein, while analyzing the plurality of tuned scheduling plans, the analysis engine is configured to determine a prioritized network scheduling objective and identify one or more tuned scheduling plans that satisfy the prioritized network scheduling objective, and wherein the analysis engine defines the current scheduling plan based on the one or more identified tuned scheduling plans and the energy conservation measure associated with each tuned scheduling plan.

6. The system of claim 5, further comprising:

a deployment engine to generate a plurality of network configuration instructions to configure the network resources to realize the current scheduling plan.

7. The system of claim 5, wherein:

the aggregation engine is to receive information describing the pending traffic from a plurality of network application via a control plane of the network; and the aggregation engine is to generate the initial scheduling plans from the information describing the pending traffic and a plurality of network paths within the network available for pending traffic, each network path from the plurality of network paths including two or more network resources from the plurality of network resources.

8. The system of claim 5, wherein the tuning system includes a plurality of tuning engines, each tuning engine from the plurality of tuning engines is to store a current scheduling plan and to incrementally generate a tuned scheduling plan from the plurality of tuned scheduling plans based on the current scheduling plan.

9. The system of claim 5, wherein the tuning system includes a plurality of tuning engines, each tuning engine from the plurality of tuning engines is to generate a tuned scheduling plan from the plurality of tuned scheduling plans according to a traffic tuning parameter for that tuning engine from a plurality of traffic tuning parameters and based on the current scheduling plan.

10. A network scheduling method, comprising:

tuning a plurality of scheduling plans according to one or more traffic tuning parameters to generate a plurality of tuned scheduling plans for network resources in a network, wherein the plurality of scheduling plans are for a single state of pending traffic, wherein generating a respective tuned scheduling plan involves determining a plurality of inactive periods associated with energy conservation modes of a plurality of the network resources, and wherein the respective tuned scheduling plan includes a combination of inactive periods and is associated with an energy conservation measure;

analyzing the plurality of tuned scheduling plans by determining a prioritized network scheduling objective and identifying one or more tuned scheduling plans that satisfy the prioritized network scheduling objective;

defining a current scheduling plan based on the one or more identified tuned scheduling plans; and generating a plurality of network configuration instructions to configure the network resources to realize the current scheduling plan.

11. The method of claim 10, further comprising:

generating the plurality of scheduling plans for network resources associated with pending traffic within the network based on information describing pending traffic in a network.

12. The method of claim 10, wherein each tuned scheduling plan from the plurality of tuned scheduling plans is tuned according to a unique traffic tuning parameter from the one or more traffic tuning parameters.

13. The method of claim 10, further comprising: storing the current scheduling plan, and wherein defining the current scheduling plan comprises accessing the current scheduling plan and incrementally modifying the current scheduling plan and the energy conservation measure associated with each tuned scheduling plan.

* * * * *